(12) United States Patent
Otaki et al.

(10) Patent No.: US 8,889,821 B2
(45) Date of Patent: Nov. 18, 2014

(54) POLYESTER AMIDE COMPOUND

(75) Inventors: Ryoji Otaki, Kanagawa (JP); Tsuneaki Masuda, Kanagawa (JP); Takafumi Oda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 218 days.

(21) Appl. No.: 13/698,411

(22) PCT Filed: Mar. 9, 2011

(86) PCT No.: PCT/JP2011/055535
§ 371 (c)(1),
(2), (4) Date: Feb. 4, 2013

(87) PCT Pub. No.: WO2011/145383
PCT Pub. Date: Nov. 24, 2011

(65) Prior Publication Data
US 2013/0149479 A1 Jun. 13, 2013

(30) Foreign Application Priority Data
May 19, 2010 (JP) .................................. 2010-115343

(51) Int. Cl.
| C08G 69/10 | (2006.01) |
| C08G 63/685 | (2006.01) |
| C08L 77/12 | (2006.01) |
| C08G 69/44 | (2006.01) |

(52) U.S. Cl.
CPC ............. *C08G 63/6856* (2013.01); *C08L 77/12* (2013.01); *C08G 69/44* (2013.01)
USPC ....... 528/328; 428/35.7; 428/474.4; 528/288; 528/310

(58) Field of Classification Search
USPC ............... 428/35.7, 474.4; 528/288, 310, 328
See application file for complete search history.

(56) References Cited

U.S. PATENT DOCUMENTS

| 3,721,682 | A | 3/1973 | Murai et al. |
| 4,343,743 | A | 8/1982 | Coquard et al. |
| 4,393,192 | A | 7/1983 | Curatolo et al. |
| 5,162,484 | A | 11/1992 | Judas |
| 6,573,340 | B1 | 6/2003 | Khemani et al. |
| 8,653,225 | B2 * | 2/2014 | Oda et al. .................. 528/330 |
| 2013/0023642 | A1 | 1/2013 | Oda et al. |

FOREIGN PATENT DOCUMENTS

| JP | 61 69831 | 4/1986 |
| JP | 61 108542 | 5/1986 |
| JP | 62 181336 | 8/1987 |
| JP | 1 167329 | 7/1989 |
| JP | 2 72851 | 3/1990 |
| JP | 3 52928 | 3/1991 |
| JP | 4 90848 | 3/1992 |
| JP | 5 345383 | 12/1993 |
| JP | 9 227671 | 9/1997 |
| JP | 2991437 | 12/1999 |
| JP | 2001 501559 | 2/2001 |
| JP | 2004 26225 | 1/2004 |
| JP | 2005 112468 | 4/2005 |
| JP | 2008 255349 | 10/2008 |
| WO | WO 2005/089824 A2 | 9/2005 |

OTHER PUBLICATIONS

International Search Report Issued May 31, 2011 in PCT/JP11/055535 Filed Mar. 9, 2011.
Extended European Search Report issued Nov. 8, 2013 in Patent Application No. 11783320.2.
U.S. Appl. No. 13/699,678, filed Nov. 23, 2012, Oda et al.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

A polyester amide compound having a polycarboxylic acid unit in an amount of 25 to 50 mol %, the polycarboxylic acid unit containing an aromatic dicarboxylic acid unit represented by the following formula (I) in an amount of 70 mol % or more; a polyhydric alcohol unit in an amount of 25 to 50 mol %, the polyhydric alcohol unit containing an aliphatic diol unit represented by the following formula (II) in an amount of 70 mol % or more; and a structural unit represented by the following formula (III) in an amount of 0.1 to 50 mol %:

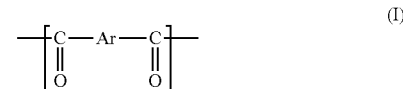

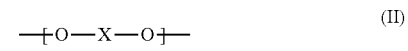

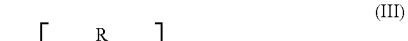

wherein, in formula (I), Ar represents an arylene group; in formula (II), X represents a C2 to C20 alkylene group; and in formula (III), R represents a substituted or unsubstituted alkyl group or a substituted or unsubstituted aryl group.

17 Claims, 1 Drawing Sheet

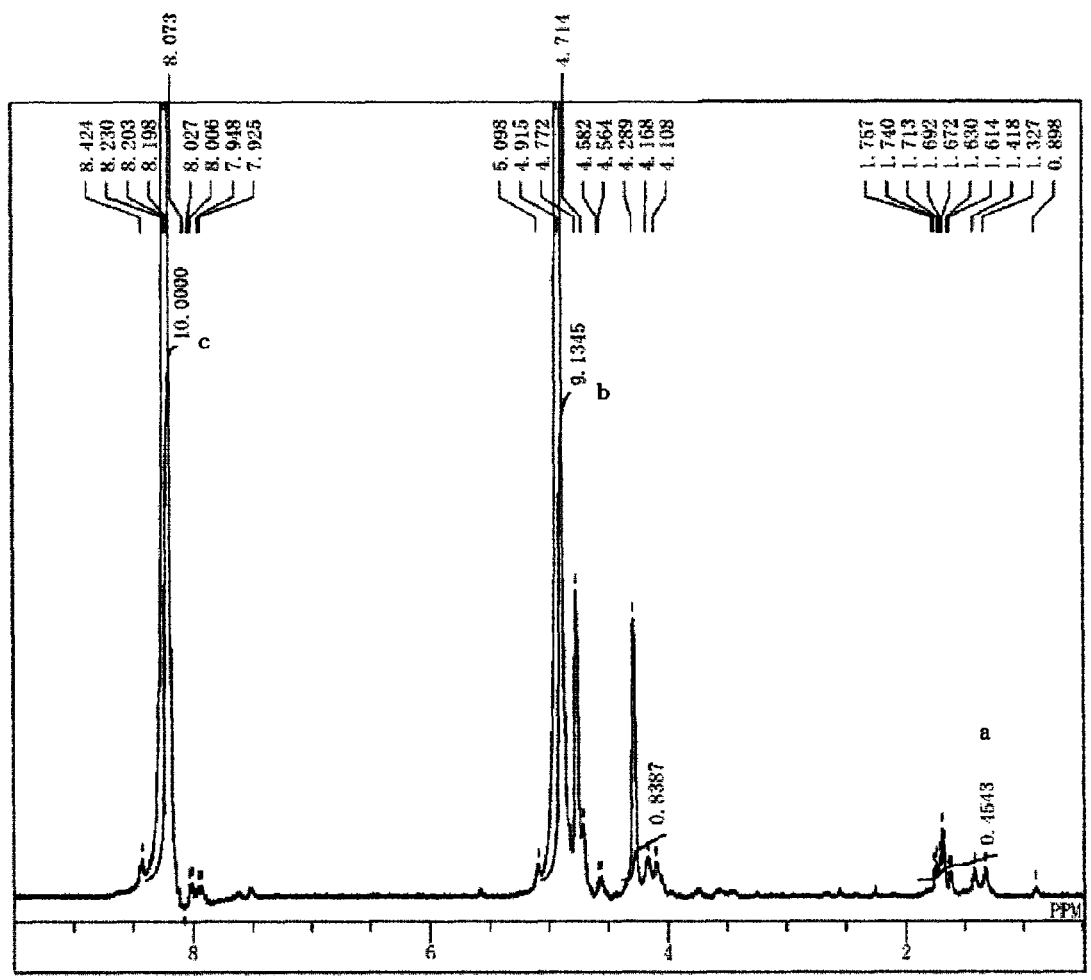

POLYESTER AMIDE COMPOUND

TECHNICAL FIELD

The present invention relates to a polyester amide compound (including a polyester amide resin and a polyester amide oligomer) exhibiting oxygen-absorbing property; and to a polyester amide composition comprising the polyester amide compound.

BACKGROUND ART

Hitherto, a container, a molded product, or the like formed of a metallic can, a glass bottle, or a thermoplastic resin has been used as a packaging material for, for example, drugs, beverages, foods, or chemicals. A container or molded product formed of a thermoplastic resin is widely used, since it is excellent in terms of light weight, moldability, packageability such as sealability, and cost. Among thermoplastic resins, a polyester mainly having ethylene terephthalate repeating units (hereinafter the polyester may be referred to as "PET") exhibits excellent mechanical properties, melt stability, solvent resistance, smell-retaining property, transparency, recyclability, etc., and thus is widely used for producing, for example, films, sheets, and hollow containers. Also, since PET exhibits relatively high oxygen barrier property, when PET is applied to a beverage bottle which is refrigerated, the content of the PET bottle can be stored for a sufficient period of time.

However, in recent years, demand has arisen for reducing the environmental burden due to mass production of plastics and increased waste. Thus, the thickness or weight of a container formed of PET has tended to be reduced. When the thickness or weight of a container formed of PET is reduced, the oxygen barrier property of the container may be deteriorated. Therefore, there has been required a technique for enhancing the oxygen barrier property of such a PET container, in order to reduce the thickness or weight of the container while maintaining its storage ability.

In a known technique for suppressing permeation of oxygen from outside a container formed of PET, PET is employed in combination with a material exhibiting oxygen barrier property superior to that of PET. For example, there have been proposed a method for producing a container having a multi-layer structure including a PET layer, and at least one layer which exhibits excellent oxygen barrier property and is formed of, for example, poly-m-xylylene adipamide, an ethylene-vinyl alcohol copolymer, polyacrylonitrile, or aluminum foil; and a method for producing a container from a layer formed through melt-blending of PET with the aforementioned thermoplastic resin exhibiting excellent oxygen barrier property (see Patent Documents 1 and 2). However, a container produced through such a method cannot completely block permeation of a very small amount of oxygen from outside the container. In addition, degradation of the content of the container, which may be due to oxygen remaining in the container, cannot be prevented.

Also, there has been proposed a method in which the interior or exterior of a container formed of PET is coated with a thermosetting resin exhibiting excellent oxygen barrier property, or is vapor-deposited with an inorganic oxide (see Patent Documents 3 and 4). However, a container produced through such a method also cannot completely block permeation of a very small amount of oxygen from outside the container. In addition, when impact or an external force such as folding force is applied to the container, cracking may occur in a thermosetting rein film or an inorganic-oxide-deposited film, resulting in a problem in that oxygen barrier property is considerably lowered.

In a known method for completely blocking permeation of a very small amount of oxygen from outside a container, the container itself is imparted with an oxygen-absorbing function. In this method, permeation of oxygen from outside the container can be prevented, and oxygen remaining in the container can be removed. Therefore, the storage ability of the content of the container can be considerably improved.

Means for achieving this method is to add an oxygen-absorbing agent to a thermoplastic resin forming the container. For example, Patent Document 5 or 6 describes an oxygen-absorbing layered product or oxygen-absorbing film formed of a resin in which an oxygen-absorbing agent containing iron powder, etc. is dispersed.

Meanwhile, Patent Document 7 describes an oxygen-scavenging wall for packaging, in which a polyamide containing a metal catalyst such as cobalt serves as an oxygen-absorbing material for absorbing oxygen present inside and outside of a container. Patent Document 8 describes a container including an oxygen-absorbing layer formed of a gas-barrier resin containing an ethylenic unsaturated compound such as polybutadiene and a transition metal catalyst such as cobalt. Also, there has been proposed a method in which a container is produced from oxygen-absorbing PET formed through copolymerization of PET with a compound having an oxygen-absorbing function. For example, Patent Document 9 describes a container formed of a copolyester having a polyester segment and a polyolefin segment exhibiting oxygen-scavenging property.

CITATION LIST

Patent Literature

[Patent Document 1] JP-A-61-108542
[Patent Document 2] JP-A-62-181336
[Patent Document 3] JP-A-5-345383
[Patent Document 4] JP-A-2004-026225
[Patent Document 5] JP-A-2-72851
[Patent Document 6] JP-A-4-90848
[Patent Document 7] Japanese Patent No. 2991437
[Patent Document 8] JP-A-2005-112468
[Patent Document 9] JP-A-2001-501559

SUMMARY OF INVENTION

Technical Field

Although an oxygen-absorbing layered product or oxygen-absorbing film formed of a resin in which an oxygen-absorbing agent such as iron powder is dispersed exhibits excellent oxygen-absorbing performance, the resin is colored black with the oxygen-absorbing agent such as iron powder, and the resin becomes non-transparent. Therefore, a limitation is imposed on the use of the resin; i.e., the resin cannot be used in the field of packaging, which requires that containers be transparent.

An oxygen-absorbing resin composition containing an oxygen-absorbing polyamide or ethylenic unsaturated compound containing a transition metal such as cobalt exhibits relatively high transparency, and thus has an advantage that the resin is applicable to a packaging container requiring transparency. However, when a certain type of transition metal catalyst is employed, the resin composition may be colored, which is not preferred. Such a resin composition exhibits an oxygen-absorbing function on the basis of the principle that the resin is oxidation-degraded by a transition metal catalyst. In the case of an oxygen-absorbing material containing a polyamide, oxygen absorption occurs through, for example, the following reactions: generation of radicals caused by removal of hydrogen atoms, by means of transition metal atoms, from a methylene chain adjacent to an arylene group of the polyamide resin; generation of peroxy radicals through addition of oxygen molecules to the above-generated radicals; and removal of hydrogen atoms by means of the peroxy radicals. When such an oxygen-absorbing material is applied to a container, decomposition reaction occurs rapidly in the polymer main chain as oxygen absorption proceeds, and problems may arise in that the container is colored yellow, and the mechanical strength of the container is considerably lowered within a short period of time.

Also, in the case of an oxygen-absorbing material containing an ethylenic unsaturated compound, since the material exhibits an oxygen-absorbing function by the effect of a transition metal catalyst, decomposition reaction occurs rapidly. When an ethylenic unsaturated compound is incorporated into the polymer main chain, similar to the case of the aforementioned polyamide, mechanical strength is lowered due to rapid decomposition of the polymer main chain, and large amounts of ketones or aldehydes, which cause an unpleasant odor, are generated. Therefore, a limitation is imposed on the packaging material to which the oxygen-absorbing material is applied. When an ethylenic unsaturated compound is dispersed in a non-oxidizable polymer, lowering of mechanical strength is suppressed, but generation of large amounts of ketones or aldehydes, which cause an unpleasant odor, cannot be avoided.

In any case, the aforementioned oxygen-scavenging resin composition containing a thermoplastic resin requires addition of a transition metal such as cobalt, the metal serving as an oxidation catalyst. When the resin composition is applied to a container for storing foods or beverages, the container must be designed to prevent elution of the oxidation catalyst. Needless to say, the container must also be devised to prevent elution of rapidly generated decomposition products. Thus, in practice, a severe limitation is imposed on the container to which the resin composition is applied, or on the use of the resin composition.

The problem to be solved by the present invention is to provide a polyester amide compound or polyester amide composition exhibiting sufficient oxygen-absorbing performance without containing a metal.

Solution to Problems

The present invention provides a polyester amide compound and a polyester amide composition, as described below.

<1> A polyester amide compound having a polycarboxylic acid unit in an amount of 25 to 50 mol %, the polycarboxylic acid unit containing an aromatic dicarboxylic acid unit represented by the following formula (I) in an amount of 70 mol % or more; a polyhydric alcohol unit in an amount of 25 to 50 mol %, the polyhydric alcohol unit containing an aliphatic diol unit represented by the following formula (II) in an amount of 70 mol % or more; and a structural unit represented by the following formula (III) in an amount of 0.1 to 50 mol %:

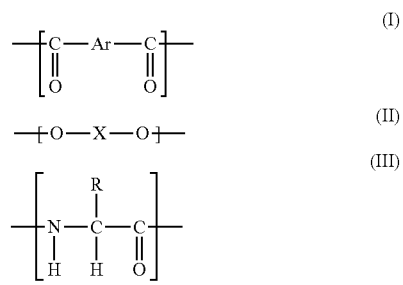

wherein, in formula (I), Ar represents an arylene group; in formula (II), X represents a C2 to C20 alkylene group; and in formula (III), R represents a substituted or unsubstituted alkyl group or a substituted or unsubstituted aryl group.

<2> A polyester amide composition comprising a polyester amide compound as recited in <1> above.

Advantageous Effects of Invention

The polyester amide compound or polyester amide composition of the present invention exhibits excellent oxygen-absorbing performance. Therefore, the polyester amide compound or polyester amide composition of the present invention is suitable for use as an oxygen-absorbing agent by charging it in a container such as a packet. More preferably, the polyester amide compound or polyester amide composition of the present invention is employed in a packaging material or a packaging container. A packaging material or packaging container containing the polyester amide compound or polyester amide composition of the present invention exhibits sufficient oxygen-absorbing performance without containing a metal. In addition, the packaging material or container does not generate an unpleasant odor, exhibits very high transparency, and can maintain the content stored therein in a good state.

BRIEF DESCRIPTION OF DRAWINGS

FIG. 1 is a $^1$H-NMR chart of a polyester amide compound produced in Example 1.

DESCRIPTION OF EMBODIMENTS

1. Polyester Amide Compound

The polyester amide compound of the present invention has a polycarboxylic acid unit in an amount of 25 to 50 mol %, the polycarboxylic acid unit containing an aromatic dicarboxylic acid unit represented by the following formula (I) in an amount of 70 mol % or more; a polyhydric alcohol unit in an amount of 25 to 50 mol %, the polyhydric alcohol unit containing an aliphatic diol unit represented by the following formula (II) in an amount of 70 mol % or more; and a tertiary-hydrogen-containing carboxylic acid unit (preferably, a structural unit represented by the following formula (III)) in an amount of 0.1 to 50 mol %:

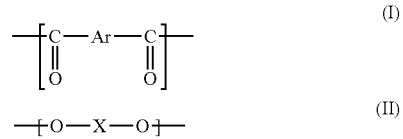

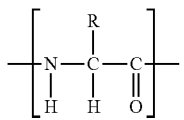

(III)

wherein, in formula (I), Ar represents an arylene group; in formula (II), X represents a C2 to C20 alkylene group; and in formula (III), R represents a substituted or unsubstituted alkyl group or a substituted or unsubstituted aryl group.

The total amount of the polycarboxylic acid unit, the polyhydric alcohol unit, and the tertiary-hydrogen-containing carboxylic acid unit does not exceed 100 mol %. The polyester amide compound of the present invention may further contain a structural unit other than the aforementioned ones, so long as the effects of the present invention are not impaired.

The polyester amide compound of the present invention encompasses a polyester amide resin and a polyester amide oligomer.

The "polyester amide resin" of the present invention, which is a type of the polyester amide compound of the present invention, corresponds to a polymer having an intrinsic viscosity of 0.4 dL/g or more. The polyester amide resin is a material which can be molded alone into a product. Specifically, the polyester amide resin can be molded into a packaging material or a packaging container. Optionally, the polyester amide resin of the present invention may be mixed with an additional resin or additive, and the resultant polyester amide composition may be molded into a product. The polyester amide resin of the present invention exhibits sufficient oxygen-absorbing performance without containing a metal. In addition, the polyester amide resin does not generate an unpleasant odor, and exhibits very high transparency.

The "polyester amide oligomer" of the present invention, which is a type of the polyester amide compound of the present invention, corresponds a polymer having an intrinsic viscosity of less than 0.4 dL/g. The polyester amide oligomer is a material which generally cannot be molded alone into a product. In general, the term "oligomer" refers to a polymer having a number average molecular weight of 1,000 or less. As used herein, the "polyester amide oligomer" of the present invention encompasses such a common oligomer, as well as a polymer having a number average molecular weight of less than 10,000.

The polyester amide oligomer of the present invention is suitable for use as an oxygen-absorbing agent by charging it in a container such as a packet. The polyester amide oligomer of the present invention may be suitable for use as a resin raw material or a resin additive. When the polyester amide oligomer of the present invention is employed as a resin raw material, the polyester amide oligomer may be copolymerized with an additional resin raw material, to thereby produce a copolymer resin. The thus-produced copolymer resin may be molded into a packaging material or a packaging container. When the polyester amide oligomer of the present invention is employed as a resin additive, a polyester amide composition prepared by adding the polyester amide oligomer to a resin may be molded into a packaging material or a packaging container. In such a case, the copolymer resin exhibits sufficient oxygen-absorbing performance without deterioration of the transparency and mechanical strength of the resin. A copolymer resin or polyester amide composition produced from the polyester amide oligomer of the present invention exhibits sufficient oxygen-absorbing performance without containing a metal, and does not generate an unpleasant odor.

The amount of the tertiary-hydrogen-containing carboxylic acid unit contained in the polyester amide compound of the present invention is 0.1 to 50 mol %. When the amount of the tertiary-hydrogen-containing carboxylic acid unit is less than 0.1 mol %, sufficient oxygen-absorbing performance may fail to be achieved, whereas when the amount of the tertiary-hydrogen-containing carboxylic acid unit exceeds 50 mol %, properties of the polyester amide compound, such as gas barrier property and mechanical property, may be deteriorated due to a very high tertiary hydrogen content. Particularly when the tertiary-hydrogen-containing carboxylic acid is an amino acid, sufficient thermal resistance may fail to be achieved due to continuous peptide bonds, and a cyclic product formed from an amino acid dimer may inhibit polymerization. In order to improve oxygen-absorbing performance and the properties of the polyester amide compound, the amount of the tertiary-hydrogen-containing carboxylic acid unit is preferably 0.2 mol % or more, more preferably 1 mol % or more, and the amount thereof is preferably 45 mol % or less, more preferably 40 mol % or less.

In order to improve oxygen-absorbing performance and polymer properties, the amount of the polycarboxylic acid unit contained in the polyester amide compound of the present invention is 25 to 50 mol %, preferably 30 to 50 mol %. Similarly, the amount of the polyhydric alcohol unit contained in the polyester amide compound of the present invention is 25 to 50 mol %, preferably 30 to 50 mol %.

1-1. Polycarboxylic Acid Unit

The polycarboxylic acid unit of the polyester amide compound of the present invention contains an aromatic dicarboxylic acid unit represented by formula (I) in an amount of 70 mol % or more, for the purpose of imparting moderate thermal resistance and oxygen barrier property. The amount of the aromatic dicarboxylic acid unit is preferably 80 mol % or more, more preferably 90 mol % or more, and the amount thereof is preferably 100 mol % or less.

In formula (I), Ar represents an arylene group. The arylene group is preferably a C6 to C30 arylene group, more preferably a C6 to C15 arylene group. Examples of the arylene group include a phenylene group and a naphthylene group.

Examples of the compound which may form the aromatic dicarboxylic acid unit represented by formula (I) include, but are not limited to, terephthalic acid, isophthalic acid, o-phthalic acid, 2,6-naphthalenedicarboxilic acid, 1,5-naphthalenedicarboxilic acid, bis(p-carboxyphenyl)methane, anthracenedicarboxylic acid, 4,4'-diphenyldicarboxylic acid, 1,2-bis(phenoxy)ethane-4,4'-dicarboxylic acid, 5-sodium sulfoisophthalic acid, and esterifiable derivatives thereof. These compounds may be employed singly or in combination of two or more species.

The aromatic dicarboxylic acid unit represented by formula (I) preferably contains, in a total amount of 50 mol % or more, at least one species selected from the group consisting of an isophthalic acid unit, a terephthalic acid unit, and a 2,6-naphthalenedicarboxylic acid unit. The total amount is preferably 70 mol % or more, more preferably 80 mol % or more, much more preferably 90 mol % or more, and the total amount is preferably 100 mol % or less.

Examples of the compound which may form a polycarboxylic acid unit other than the aromatic dicarboxylic acid unit represented by formula (I) include, but are not limited to, C2 to C20 (preferably C4 to C16, more preferably C4 to C12) aliphatic dicarboxylic acids, alicyclic dicarboxylic acids, tri- or more-valent polycarboxylic acids, anhydrides of these acids, and alkyl (C1 to C3) esters of these acids.

Examples of the C2 to C20 aliphatic dicarboxylic acid include oxalic acid, malonic acid, succinic acid, glutaric acid, adipic acid, pimelic acid, suberic acid, azelaic acid, sebacic acid, fumaric acid, maleic acid, citraconic acid, 2-methylsuccinic acid, itaconic acid, and glutaconic acid. Examples of the alicyclic dicarboxylic acid include cyclohexanedicarboxylic acids and decalindicarboxylic acids. Examples of the tri- or more-valent polycarboxylic acid include trimellitic acid and pyromellitic acid.

1-2. Polyhydric Alcohol Unit

The polyhydric alcohol unit of the polyester amide compound of the present invention contains an aliphatic diol unit represented by formula (II) in an amount of 70 mol % or more, for the purpose of imparting flexibility required for a packaging material. The amount of the aliphatic diol unit is preferably 80 mol % or more, more preferably 90 mol % or more, and the amount thereof is preferably 100 mol % or less.

In formula (II), X represents a C2 to C20 alkylene group. The number of carbon atoms of the alkylene group is preferably 2 to 16, more preferably 2 to 12, much more preferably 2 to 6. The alkylene group may be in a linear, branched, or cyclic form.

Examples of the compound which may form the aliphatic diol unit represented by formula (II) include, but are not limited to, C2 to C20 aliphatic diols, such as ethylene glycol, propylene glycol (1,2-propanediol), 1,3-propanediol, 1,4-butanediol, 2,3-butanediol, 1,5-pentanediol, neopentyl glycol, 1,8-octanediol, 1,10-decanediol, 1,12-dodecanediol, and 1,4-cyclohexanediol; and esterifiable derivatives thereof. These compounds may be employed singly or in combination of two or more species.

The aliphatic diol unit represented by formula (II) preferably contains, in a total amount of 50 mol % or more, at least one species selected from the group consisting of an ethylene glycol unit, a 1,3-propanediol unit, and a 1,4-butanediol unit. The total amount is preferably 70 mol % or more, more preferably 80 mol % or more, much more preferably 90 mol % or more, and the total amount is preferably 100 mol % or less.

Examples of the compound which may form a polyhydric alcohol unit other than the aliphatic diol unit represented by formula (II) include, but are not limited to, hydrogenated bisphenol A, aromatic diols, and tri- or more-valent polyhydric alcohols.

Examples of the aromatic diol include hydroquinone, resorcin, bisphenol A, 4,4'-dihydroxybiphenyl, 4,4'-dihydroxydiphenyl ether, and 4,4'-dihydroxydiphenyl benzophenone. Examples of the tri- or more-valent polyhydric alcohol include glycerin, pentaerythritol, and trimethylolpropane.

1-3. Tertiary-Hydrogen-Containing Carboxylic Acid Unit

In the present invention, the tertiary-hydrogen-containing carboxylic acid unit has at least one amino group and at least one carboxyl group, from the viewpoint of polymerization of the polyester amide compound. Specific examples of the tertiary-hydrogen-containing carboxylic acid unit include a structural unit represented by the following formula (III) or (IV):

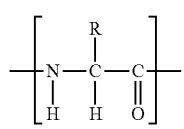

(III)

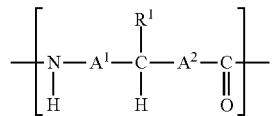

(IV)

wherein, in the above-mentioned general formula (III) and (IV), R and $R^1$ each independently represent a substituent, and $A^1$ and $A^2$ each independently represent a single bond or a divalent linking group, provided that the case where both $A^1$ and $A^2$ are single bonds in the general formula (IV) is excluded.

The polyester amide compound of the present invention has such a tertiary-hydrogen-containing carboxylic acid unit. Since the polyester amide compound of the present invention has the tertiary-hydrogen-containing carboxylic acid unit as a copolymerization component, the polyester amide compound exhibits excellent oxygen-absorbing performance without containing a transition metal.

There has not yet been elucidated the mechanism by which the polyester amide compound of the present invention, which has the tertiary-hydrogen-containing carboxylic acid unit, exhibits favorable oxygen-absorbing performance. However, the mechanism is considered to be as follows. In a compound which may form the tertiary-hydrogen-containing carboxylic acid unit, an electron-attracting group and an electron-donating group are bonded to the same carbon atom. Therefore, conceivably, a very stable radical is generated by means of the so-called captodative effect; i.e., an unpaired electron present on the carbon atom is energetically stabilized. Specifically, since the carbon atom bonded to a tertiary hydrogen atom adjacent to a carboxyl group, which is an electron-attracting group, becomes electron deficient ($\delta^+$), the tertiary hydrogen atom also becomes electron deficient ($\delta^+$), and the hydrogen atom is released as a proton, to thereby form a radical. Conceivably, when oxygen and water are present around the polyester amide compound, the polyester amide compound exhibits oxygen-absorbing performance through reaction between the thus-formed radical and oxygen. As has been found, high reactivity is achieved at high humidity and high temperature.

In formulas (III) and (IV), each of R and R' represents a substituent. In the present invention, examples of the substituent represented by R or R' include a halogen atom (for example, chlorine, bromine, or iodine); an alkyl group (a linear, branched, or cyclic alkyl group having 1 to 15 carbon atoms, preferably 1 to 6 carbon atoms; for example, methyl, ethyl, n-propyl, isopropyl, t-butyl, n-octyl, 2-ethylhexyl, cyclopropyl, or cyclopentyl); an alkenyl group (a linear, branched, or cyclic alkenyl group having 2 to 10 carbon atoms, preferably 2 to 6 carbon atoms; for example, vinyl or allyl); an alkynyl group (an alkynyl group having 2 to 10 carbon atoms, preferably 2 to 6 carbon atoms; for example, ethynyl or propargyl); an aryl group (an aryl group having 6 to 16 carbon atoms, preferably 6 to 10 carbon atoms; for example, phenyl or naphthyl); a heterocyclic group (a monovalent group having 1 to 12 carbon atoms, preferably 2 to 6 carbon atoms, which is formed through removal of one hydrogen atom from a 5-membered or 6-membered aromatic or non-aromatic heterocyclic compound; for example, 1-pyrazolyl, 1-imidazolyl, or 2-furyl); a cyano group; a hydroxyl group; a nitro group; an alkoxy group (a linear, branched, or cyclic alkoxy group having 1 to 10 carbon atoms, preferably 1 to 6 carbon atoms; for example, methoxy or ethoxy); an aryloxy group (an aryloxy group having 6 to 12 carbon atoms, preferably 6 to 8 carbon atoms; for example, phenoxy); an acyl group (a formyl group, an alkylcarbonyl group having 2 to 10 carbon atoms, preferably 2 to 6 carbon atoms, or an arylcarbonyl group having 7 to 12 carbon atoms, preferably 7 to 9 carbon atoms; for example, acetyl, pivaloyl, or benzoyl); an amino group (an amino group, an alkylamino group having 1 to 10 carbon atoms, preferably 1 to 6 carbon atoms, an anilino group having 6 to 12 carbon atoms, preferably 6 to 8 carbon atoms, or a heterocyclic amino group having 1 to 12 carbon atoms, preferably 2 to 6 carbon atoms; for example, amino, methylamino, or anilino); a mercapto group; an alkylthio group (an alkylthio group having 1 to 10 carbon atoms, preferably 1 to 6 carbon atoms; for example, methylthio or ethylthio); an arylthio group (an arylthio group having 6 to 12 carbon atoms, preferably 6 to 8 carbon atoms; phenylthio); a heterocyclic thio group (a heterocyclic thio group having 2 to 10 carbon atoms, preferably 1 to 6 carbon atoms; for example, 2-benzothiazolylthio); and an imido group (an imido group having 2 to 10 carbon atoms, preferably 4 to 8 carbon atoms; for example, N-succinimido or N-phthalimido).

Among these functional groups, a functional group having a hydrogen atom may be further substituted by any of the aforementioned groups. Examples of the substituted functional group include, but are not limited to, an alkyl group substituted by a hydroxyl group (e.g., a hydroxyethyl group); an alkyl group substituted by an alkoxy group (e.g., a methoxyethyl group); an alkyl group substituted by an aryl group (e.g., a benzyl group); an aryl group substituted by an alkyl group (e.g., a p-tolyl group); and an aryloxy group substituted by an alkyl group (e.g., a 2-methylphenoxy group).

When a functional group is substituted by an additional substituent, the aforementioned number of carbon atoms does not include the number of carbon atoms of the additional substituent. For example, a benzyl group is regarded as a C1 alkyl group substituted by a phenyl group, and is not regarded as a C7 alkyl group substituted by a phenyl group. Unless otherwise specified, hereinafter, the same shall apply regarding description of the number of carbon atoms.

In formula (IV), each of $A^1$ and $A^2$ represents a single bond or a divalent linking group, exclusive of the case where both $A^1$ and $A^2$ are a single bond. Examples of the divalent linking group include a linear, branched, or cyclic alkylene group (an alkylene group having 1 to 12 carbon atoms, preferably 1 to 4 carbon atoms; for example, methylene or ethylene); an aralkylene group (an aralkylene group having 7 to 30 carbon atoms, preferably 7 to 13 carbon atoms; for example, benzylidene); and an arylene group (an arylene group having 6 to 30 carbon atoms, preferably 6 to 15 carbon atoms; for example, phenylene). Such a divalent linking group may have an additional substituent. The substituent may be, for example, any of the functional groups exemplified above as substituents represented by R or $R^1$. Examples of the substituent include, but are not limited to, an arylene group substituted by an alkyl group (e.g., xylylene).

The polyester amide compound of the present invention preferably has at least one of structural units represented by formulas (III) and (IV). Of these structural units, more preferred is a carboxylic acid unit having a tertiary hydrogen atom on the a-carbon atom (i.e., the carbon atom adjacent to a carboxyl group), and particularly preferred is a structural unit represented by formula (III), from the viewpoints of availability of raw materials, and improvement of oxygen-absorbing performance.

The radical R in formula (III), which is as described above, is more preferably a substituted or unsubstituted alkyl group or a substituted or unsubstituted aryl group, much more preferably a substituted or unsubstituted C1 to C6 alkyl group or a substituted or unsubstituted C6 to C10 aryl group, particularly preferably a substituted or unsubstituted C1 to C4 alkyl group or a substituted or unsubstituted phenyl group. Specific examples of preferred groups represented by R include, but are not limited to, methyl, ethyl, n-propyl, isopropyl, n-butyl, t-butyl, 1-methylpropyl, 2-methylpropyl, hydroxymethyl, 1-hydroxyethyl, mercaptomethyl, methylsulfanylethyl, phenyl, naphthyl, benzyl, and 4-hydroxybenzyl. Of these, methyl, ethyl, and benzyl are more preferred.

Examples of the compound which may form a structural unit represented by formula (III) include, but are not limited to, a-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophan, and proline.

Examples of the compound which may form a structural unit represented by formula (IV) include, but are not limited to, β-amino acids such as 3-aminobutyric acid.

Such a compound may be in a D-form, L-form, racemic form, or allo-form. These compounds may be employed singly or in combination of two or more species.

Among the aforementioned compounds, particularly preferred is an α-amino acid having a tertiary hydrogen atom on the α-carbon atom, from the viewpoints of, for example, availability of raw materials, and improvement of oxygen-absorbing performance. Among a-amino acids, alanine is most preferred, from the viewpoints of easy supply, low cost, easy polymerization, and low polymer yellowing index (YI). Since alanine has a relatively low molecular weight, the percent copolymerization per 1 g of the polyester amide compound of the present invention is high, and thus the oxygen-absorbing performance per 1 g of the polyester amide compound is high.

The purity of a compound which may form the aforementioned tertiary-hydrogen-containing carboxylic acid unit is preferably 95% or more, more preferably 98.5% or more, much more preferably 99% or more, in consideration of the effect of reduced polymerization rate, etc. on polymerization, or the effect of polymer yellowing index, etc. on the quality of a final product. The amount of an impurity contained in the compound, such as sulfate ion or ammonium ion, is preferably 500 ppm or less, more preferably 200 ppm or less, much more preferably 50 ppm or less.

1-4. Polymerization Degree of Polyester Amide Compound

The polymerization degree of the polyester amide compound of the present invention is represented by the intrinsic viscosity thereof, since the polyester amide compound is employed in an application similar to that of a polyester resin. The intrinsic viscosity of the polyester amide compound of the present invention is preferably 0.1 dL/g to 1.5 dL/g.

When the polyester amide compound of the present invention is a polyester amide resin, the intrinsic viscosity thereof is preferably 0.4 to 1.5 dL/g, more preferably 0.5 to 1.2 dL/g, much more preferably 0.6 to 1.0 dL/g, for improvement of, for example, the moldability of the resin, and the mechanical properties, strength, and odor of a molded product. However, when the polyester amide resin of the present invention is employed as, for example, an additive or a modifier for another thermoplastic resin, the intrinsic viscosity is not limited to the aforementioned ranges.

When the polyester amide compound of the present invention is a polyester amide oligomer, the intrinsic viscosity thereof is preferably 0.1 dL/g or more and less than 0.4 dL/g, more preferably 0.15 to 0.35 dL/g, much more preferably 0.15 to 0.3 dL/g, for improvement of handleability, reactivity, and thermal stability. Intrinsic viscosity may be determined through the method described in the Examples hereinbelow. Adjustment of intrinsic viscosity to fall within the aforementioned ranges may be carried out by appropriately regulating, for example, polymerization time, the amount of a catalyst employed, and the vacuum during polymerization.

2. Production Method for Polyester Amide Compound

The polyester amide compound of the present invention may be produced through polycondensation between a polycarboxylic acid component which may form the aforementioned polycarboxylic acid unit, a polyhydric alcohol component which may form the aforementioned polyhydric alcohol unit, and a tertiary-hydrogen-containing carboxylic acid component which may form the aforementioned tertiary-hydrogen-containing carboxylic acid unit. The polymerization degree of the polyester amide compound may be controlled by regulating, for example, polycondensation conditions. During polycondensation, a small amount of a monoamine, a monoalcohol, or a monocarboxylic acid may be added as a molecular-weight-adjusting agent.

No particular limitation is imposed on the method for producing the polyester amide compound of the present invention through polycondensation, and the polyester amide compound may be produced through any conventionally known method. Examples of the production method include melt polymerization methods such as transesterification and direct esterification; and solution polymerization methods. In the transesterification method, a methyl ester of a polycarboxylic acid component and a polyhydric alcohol component, and optionally any of the aforementioned copolymerization components are caused to react with one another in the presence of a transesterification catalyst; the thus-produced methanol is removed through evaporation for transesterification; and then polycondensation is allowed to proceed by addition of a polymerization catalyst. In the direct esterification method, a polycarboxylic acid component and a polyhydric alcohol component, and optionally any of the aforementioned copolymerization components are caused to react with one another directly; the thus-generated water is removed through evaporation for esterification; and then polycondensation is allowed to proceed by addition of a polymerization catalyst. In order to effectively produce the polyester amide compound of the present invention, the direct esterification method is preferably employed, from the viewpoint of the reactivity of each component of the polyester amide compound.

In the direct esterification method, addition of a tertiary-hydrogen-containing carboxylic acid component may be carried out in any step of the polycondensation process. However, in order to reliably incorporate the tertiary-hydrogen-containing carboxylic acid component into the polymer, addition of the component is preferably carried out in a step in which polymerization degree is low. For example, addition of the tertiary-hydrogen-containing carboxylic acid component may be carried out in a step of esterification between a polycarboxylic acid component and a polyhydric alcohol component, or a step of adding a polycondensation catalyst to a product of low polymerization degree.

2-1. Catalyst and Additive

Production of the polyester amide compound may employ conventionally known catalysts and additives, including a transesterification catalyst, an esterification catalyst, an etherification preventing agent, a polymerization catalyst employed for polymerization, a stabilizer such as a thermal stabilizer or a light stabilizer, and a polymerization controlling agent.

Examples of the transesterification catalyst or the esterification catalyst include compounds of manganese, cobalt, zinc, titanium, calcium, etc. Examples of the etherification preventing agent include amine compounds.

Examples of the polymerization catalyst include a germanium-containing compound, an antimony-containing compound, a titanium-containing compound, and an aluminum-containing compound. Examples of the germanium-containing compound include amorphous germanium dioxide, crystalline germanium dioxide, germanium chloride, germanium tetraethoxide, germanium tetra-n-butoxide, and germanium phosphite. The amount of the germanium-containing compound employed is determined so that the germanium atom concentration of the polyester amide compound is adjusted to preferably 5 to 150 ppm, more preferably 10 to 100 ppm, much more preferably 15 to 70 ppm.

Examples of the antimony-containing compound include antimony trioxide, antimony acetate, antimony tartrate, antimony potassium tartrate, antimony oxychloride, antimony glycolate, antimony pentoxide, and triphenylantimony. The amount of the antimony-containing compound employed is determined so that the antimony atom concentration of the polyester amide compound is adjusted to preferably 10 to 400 ppm, more preferably 20 to 350 ppm, much more preferably 30 to 300 ppm.

Examples of the titanium-containing compound include tetraalkyl titanates such as tetraethyl titanate, tetraisopropyl titanate, tetra-n-propyl titanate, and tetra-n-butyl titanate, and partially hydrolyzed products thereof; titanyl oxalate compounds such as titanyl oxalate, ammonium titanyl oxalate, sodium titanyl oxalate, potassium titanyl oxalate, calcium titanyl oxalate, and strontium titanyl oxalate; titanium trimellitate; titanium sulfate; and titanium chloride. The amount of the titanium-containing compound employed is determined so that the titanium atom concentration of the polyester amide compound is adjusted to preferably 0.5 to 300 ppm, more preferably 1 to 200 ppm, much more preferably 3 to 100 ppm.

Examples of the aluminum-containing compound include carboxylic acid salts such as aluminum formate, aluminum acetate, aluminum propionate, and aluminum oxalate; oxides; aluminum hydroxide; aluminum chloride; aluminum chloride hydroxide; inorganic acid salts such as aluminum carbonate; aluminum alkoxides such as aluminum methoxide and aluminum ethoxide; aluminum acetylacetonate; aluminum xylate compounds with aluminum acetylacetate, etc.; organoaluminum compounds such as trimethylaluminum and triethylaluminum; and partially hydrolyzed products thereof. The amount of the aluminum-containing compound employed is determined so that the aluminum atom concentration of the polyester amide compound is adjusted to preferably 1 to 400 ppm, more preferably 3 to 300 ppm, much more preferably 5 to 200 ppm.

Production of the polyester amide compound of the present invention may employ an alkali metal compound or an alkaline earth metal compound. Examples of the alkali metal compound or the alkaline earth metal compound include carboxylic acid salts and alkoxides of alkali metals or alkaline earth metals. The amount of the alkali metal compound or alkaline earth metal compound employed is determined so that the alkali metal or alkaline earth metal atom concentration of the polyester amide compound is adjusted to preferably 0.1 to 200 ppm, more preferably 0.5 to 150 ppm, much more preferably 1 to 100 ppm.

Production of the polyester amide compound of the present invention may employ, as a thermal stabilizer, one or more of phosphoric acid, phosphorous acid, phosphonic acid, and derivatives thereof. Examples of the phosphorus-containing compound include phosphoric acid, phosphoric acid trimethyl ester, phosphoric acid triethyl ester, phosphoric acid tributyl ester, phosphoric acid triphenyl ester, phosphoric acid monomethyl ester, phosphoric acid dimethyl ester, phosphoric acid monobutyl ester, phosphoric acid dibutyl ester, phosphorous acid, phosphorous acid trimethyl ester, phosphorous acid triethyl ester, phosphorous acid tributyl ester, methylphosphonic acid, methylphosphonic acid dimethyl ester, ethylphosphonic acid dimethyl ester, phenylphosphonic acid diethyl ester, and phenylphosphonic acid diphenyl ester. The amount of the phosphorus-containing compound employed is determined so that the phosphorus atom concentration of the polyester amide compound is adjusted to preferably 1 to 200 ppm, more preferably 2 to 150 ppm, much more preferably 3 to 100ppm.

Upon production of the polyester amide compound of the present invention, a higher alcohol such as lauryl alcohol may be added for controlling the weight average molecular weight of the polyester amide compound. A polyhydric alcohol such as glycerin may be added for the purpose of improving the properties of the polyester amide compound. In addition, any of the below-described additives may be added.

2-2. Process for Increasing Polymerization Degree

The polyester amide compound produced through the aforementioned polymerization method may be employed as is, or may be subjected to a process for further increasing polymerization degree. The process for further increasing polymerization degree may be, for example, reactive extrusion in an extruder, or solid-phase polymerization. Examples of the heating apparatus which is preferably employed for solid-phase polymerization include, but are not limited to, known heating apparatuses, such as a continuous heating/drying apparatus; a rotary drum-type heating apparatus which is called, for example, "tumble dryer," "conical dryer," or "rotary dryer"; and a conical heating apparatus which is called "nauta mixer" and which has a rotary blade inside thereof. Particularly when the polyester amide compound is subjected to solid-phase polymerization, a rotary drum-type heating apparatus is preferably selected from among the aforementioned apparatuses, since the reaction system can be closed, and polycondensation is readily allowed to proceed while removing oxygen, which may cause coloration of the polyester amide composition.

3. Polyester Amide Composition

The polyester amide composition of the present invention contains the polyester amide compound of the present invention. The polyester amide composition of the present invention is a mixture obtained by mixing the polyester amide resin or polyester amide oligomer of the present invention with any additive or any resin. In the mixture, the polyester amide resin or the polyester amide oligomer may react with the added additive or resin.

3-1. Additive

In consideration of the required performance, the polyester amide compound of the present invention may be mixed with an additive such as a lubricant, a nucleating agent, a whitening preventing agent, a matting agent, a heat-resistant stabilizer, a weather-resistant stabilizer, a UV absorbent, a plasticizer, a flame retardant, an antistatic agent, a coloration inhibitor, an antioxidant, or an impact-resistance-improving material, to thereby prepare a polyester amide composition. Such an additive may optionally be added to the polyester amide compound, so long as the effects of the present invention are not impaired.

Mixing of the polyester amide compound of the present invention with an additive may be carried out through a conventionally known method. Preferably, there is employed dry mixing, which can be performed at low cost without undergoing thermal history. For example, the polyester amide compound and any of the aforementioned additives may be added to a tumbler, and they may mixed together by rotating the tumbler. Alternatively, the present invention may employ a method in which a viscous liquid serving as a spreader is deposited onto the polyester amide compound, and then an additive is added to and mixed with the polyester amide compound, in order to prevent classification of the polyester amide compound and the additive after dry mixing. Examples of the spreader include, but are not limited to, surfactants. The spreader employed may be any known one.

3-1-1. Whitening Preventing Agent

In the polyester amide composition of the present invention, preferably, a diamide compound and/or a diester compound is added to the polyester amide compound for suppressing whitening after hot water treatment or after the elapse of a long period of time. A diamide compound and/or a diester exhibits the effect of suppressing whitening caused by precipitation of the oligomer. A diamide compound and a diester compound may be employed singly or in combination.

The diamide compound employed in the present invention is preferably a diamide compound formed of a C8 to C30 aliphatic dicarboxylic acid and a C2 to C10 diamine. When a diamide compound formed of an aliphatic dicarboxylic acid having eight or more carbon atoms and a diamine having two or more carbon atoms is employed, the effect of preventing whitening is expected. When a diamide compound formed of an aliphatic dicarboxylic acid having 30 or less carbon atoms and a diamine having 10 or less carbon atoms is employed, the diamide compound is effectively uniformly dispersed in the polyester amide composition. The aliphatic dicarboxylic acid employed may have a side chain or a double bond, but is preferably a linear saturated aliphatic dicarboxylic acid. A single diamide compound may be employed, or two or more diamide compounds may be employed in combination.

Examples of the aforementioned aliphatic dicarboxylic acid include stearic acid (C 18), eicosanoic acid (C20), behenic acid (C22), montanic acid (C28), and triacontanoic acid (C30). Examples of the aforementioned diamine include ethylenediamine, butylenediamine, hexanediamine, xylylenediamine, and bis(aminomethyl)cyclohexane. Diamide compounds formed of combinations of these aliphatic dicarboxylic acids and diamines are preferably employed.

Preferred is a diamide compound formed of a C8 to C30 aliphatic dicarboxylic acid and a diamine mainly containing ethylenediamine, or a diamide compound formed of an aliphatic dicarboxylic acid mainly containing montanic acid and a C2 to C10 diamine. Particularly preferred is a diamide compound formed of an aliphatic dicarboxylic acid mainly containing stearic acid and a diamine mainly containing ethylenediamine.

The diester compound employed in the present invention is preferably a diester compound formed of a C8 to C30 aliphatic dicarboxylic acid and a C2 to C10 diol. When a diester compound formed of an aliphatic dicarboxylic acid having eight or more carbon atoms and a diamine having two or more carbon atoms is employed, the effect of preventing whitening is expected. When a diester compound formed of an aliphatic dicarboxylic acid having 30 or less carbon atoms and a diol having 10 or less carbon atoms is employed, the diester compound is effectively uniformly dispersed in the polyester amide composition. The aliphatic dicarboxylic acid employed may have a side chain or a double bond, but is preferably a linear saturated aliphatic dicarboxylic acid. A single diester compound may be employed, or two or more diester compounds may be employed in combination.

Examples of the aforementioned aliphatic dicarboxylic acid include stearic acid (C18), eicosanoic acid (C20), behenic acid (C22), montanic acid (C28), and triacontanoic acid (C30). Examples of the aforementioned diol include ethylene glycol, propanediol, butanediol, hexanediol, xylylene glycol, and cyclohexanedimethanol. Diester compounds formed of combinations of these aliphatic dicarboxylic acids and diols are preferably employed.

Particularly preferred is a diester compound formed of an aliphatic dicarboxylic acid mainly containing montanic acid and a diol mainly containing ethylene glycol and/or 1,3-butanediol.

In the present invention, the amount of the diamide compound and/or diester compound added is 0.005 to 0.5 parts by mass, preferably 0.05 to 0.5 parts by mass, particularly preferably 0.12 to 0.5 parts by mass, on the basis of 100 parts by mass of the polyester amide compound. When the diamide compound and/or the diester compound is added in an amount of 0.005 parts by mass or more on the basis of 100 parts by mass of the polyester amide compound, and a nucleating agent is employed in combination with the diamide compound and/or the diester compound, a synergistic effect of preventing whitening is expected. When the diamide compound and/or the diester compound is added in an amount of 0.5 parts by mass or less on the basis of 100 parts by mass of the polyester amide compound, the haze of a molded product produced through molding of the polyester amide composition of the present invention can be maintained at a low level.

3-1-2. Nucleating Agent

The polyester amide composition of the present invention preferably contains a nucleating agent for improvement of transparency. A nucleating agent exhibits the effect of improving transparency, as well as the effect of suppressing whitening caused by crystallization after hot water treatment or after the elapse of a long period of time. When a nucleating agent is added to the polyester amide compound, spherulite size is reduced to ½ or less the wavelength of visible light, and whitening can be suppressed. When a diamide compound and/or a diester compound is employed in combination with a nucleating agent, by means of a synergistic effect of these substances, whitening is suppressed to an extent which is much higher than that expected from the whitening suppressing effect of each of these substances.

The nucleating agent employed in the present invention may be an inorganic nucleating agent which is generally used for a thermoplastic resin. Examples of the inorganic nucleating agent include glass fillers (e.g., glass fiber, milled glass fiber (milled fiber), glass flakes, and glass beads), calcium silicate fillers (e.g., wollastonite), mica, talc (e.g., powdery talc, and granular talc containing rosin as a binder), kaolin, potassium titanate whisker, boron nitride, clay such as a layered silicate salt, nanofillers, and carbon fiber. These nucleating agents may be employed in combination of two or more species. The maximum size of an inorganic nucleating agent is preferably 0.01 to 5 μm. Particularly, powdery talc having a particle size of 3.0 μm or less is preferred, powdery talc having a particle size of about 1.5 to about 3.0 μm is more preferred, and powdery talc having a particle size of 2.0 μm or less is particularly preferred. Granular talc prepared by mixing such powdery talc with rosin serving a binder is particularly preferably employed, since the granular talc is effectively dispersed in the polyester amide composition. Examples of preferred organic nucleating agents include a capsule containing a nucleating agent and formed of a bimolecular membrane having a size of micrometer to nanometer order, a transparent nucleating agent such as a bis(benzylidene) sorbitol nucleating agent or a phosphorus-containing nucleating agent, and a rosin amide gelling agent. Particularly, a bis(benzylidene) sorbitol nucleating agent is preferably employed.

The amount of the nucleating agent added is preferably 0.005 to 2.0 parts by mass, particularly preferably 0.01 to 1.5 parts by mass, on the basis of 100 parts by mass of the polyester amide composition. When at least one species of the aforementioned nucleating agents is added to the polyester amide compound in combination with a diamide compound and/or a diester compound, a synergistic effect of preventing whitening is obtained. Particularly preferably, an inorganic nucleating agent such as talc is added in an amount of 0.05 to 1.5 parts by mass on the basis of 100 parts by mass of the polyester amide compound, and an organic nucleating agent such as a bis(benzylidene) sorbitol nucleating agent is added in an amount of 0.01 to 0.5 parts by mass on the basis of 100 parts by mass of the polyester amide compound.

The bis(benzylidene) sorbitol nucleating agent is selected from among bis(benzylidene) sorbitol and bis(alkylbenzylidene) sorbitol. The bis(benzylidene) sorbitol nucleating agent is a condensation product (diacetal compound) produced through acetalation reaction between sorbitol and benzaldehyde or alkyl-substituted benzaldehyde, and may be conveniently prepared through a variety of synthesis methods known in the art. The alkyl group may be a chain-form, cyclic-form, saturated, or unsaturated alkyl group. In a general synthesis method, 1 mol of D-sorbitol is caused to react with about 2 mol of an aldehyde in the presence of an acid catalyst. The reaction temperature may vary in a wide range with the properties (e.g., melting point) of the aldehyde serving as a reaction starting material. The reaction medium may be an aqueous medium or a non-aqueous medium. One preferred method which may be used for preparing the diacetal employed in the present invention is described in the specification of U.S. Pat. No. 3,721,682. The content disclosed in this patent document is limited to production of benzylidene sorbitol compounds. However, the bis(alkylbenzylidene) sorbitol employed in the present invention may be conveniently produced through the method described in this patent document.

Specific examples of the bis(benzylidene) sorbitol nucleating agent (diacetal compound) include bis(p-methylbenzylidene) sorbitol, bis(p-ethylbenzylidene) sorbitol, bis(n-propylbenzylidene) sorbitol, bis(p-isopropylbenzylidene) sorbitol, bis(p-isobutylbenzylidene) sorbitol, bis(2,4-dimethylbenzylidene) sorbitol, bis(3,4-dimethylbenzylidene) sorbitol, bis(2,4,5-trimethylbenzylidene) sorbitol, bis(2,4,6-trimethylbenzylidene) sorbitol, and bis(4-biphenylbenzylidene) sorbitol.

Examples of the alkyl-substituted benzaldehyde which is preferably employed for preparing the bis(benzylidene) sorbitol nucleating agent include p-methylbenzaldehyde, n-propylbenzaldehyde, p-isopropylbenzaldehyde, 2,4-dimethylbenzaldehyde, 3,4-dimethylbenzaldehyde, 2,4,5-trimethylbenzaldehyde, 2,4,6-trimethylbenzaldehyde, and 4-biphenylbenzaldehyde.

When a nucleating agent such as talc, mica, or clay is added to the polyester amide compound, crystallization rate becomes twice or more, as compared with the case where no nucleating agent is added to the polyester amide compound. No problem arises when the polyester amide compound is applied to injection molding, which requires high molding cycle. However, in the case where the polyester amide compound is applied to, for example, a deep-drawn cup formed of a stretched film or sheet, when crystallization rate is excessively high, stretching of a film or a sheet fails to be achieved due to occurrence of crystallization, and moldability is considerably lowered; for example, breakage or non-uniform stretching occurs. In contrast, even when a bis(benzylidene) sorbitol nucleating agent is added to the polyester amide compound, crystallization rate does not increase. Therefore, when the polyester amide compound is applied to, for example, a deep-drawn cup formed of a stretched film or sheet, a bis(benzylidene) sorbitol nucleating agent is preferably employed.

As has been found, a bis(benzylidene) sorbitol nucleating agent exhibits the effect of suppressing whitening, and, when a bis(benzylidene) sorbitol nucleating agent is added to the polyester amide compound, oxygen barrier property is improved. Particularly preferably, a bis(benzylidene) sorbitol (A) nucleating agent, which exhibits both the effects of suppressing whitening and of improving oxygen barrier property, is employed.

The polyester amide composition of the present invention containing a layered silicate salt may be employed for forming a gas barrier layer. A molded product formed from the composition exhibits improved oxygen barrier property, as well as improved barrier property against a gas other than oxygen gas, such as carbon dioxide gas.

The layered silicate salt is a 2-octahedral or 3-octahedral layered silicate salt having a charge density of 0.25 to 0.6. Examples of the 2-octahedral layered silicate salt include montmorillonite and beidellite. Examples of the 3-octahedral layered silicate salt include hectorite and saponite. Of these, montmorillonite is preferred.

Preferably, the layered silicate salt is brought into contact with an organic swelling agent such as a polymer compound or an organic compound in advance, so as to increase the interlayer distance of the layered silicate salt. The organic swelling agent employed is preferably a quaternary ammonium salt. A quaternary ammonium salt having at least one alkyl or alkenyl group having 12 or more carbon atoms is preferably employed.

Specific examples of the organic swelling agent include trimethylalkylammonium salts such as trimethyldodecylammonium salts, trimethyltetradecylammonium salts, trimethylhexadecylammonium salts, trimethyloctadecylammonium salts, and trimethyleicosylammonium salts; trimethylalkenylammonium salts such as trimethyloctadecenylammonium salts and trimethyloctadecadienylammonium salts; triethylalkylammonium salts such as triethyldodecylammonium salts, triethyltetradecylammonium salts, triethylhexadecylammonium salts, and triethyloctadecylammonium salts; tributylalkylammonium salts such as tributyldodecylammonium salts, tributyltetradecylammonium salts, tributylhexadecylammonium salts, and tributyloctadecylammonium salts; dimethyldialkylammonium salts such as dimethyldidodecylammonium salts, dimethylditetradecylammonium salts, dimethyldihexadecylammonium salts, dimethyldioctadecylammonium salts, and dimethylditallowammonium salts; dimethyldialkenylammonium salts such as dimethyldioctadecenylammonium salts and dimethyldioctadecadienylammonium salts; diethyldialkylammonium salts such as diethyldidodecylammonium salts, diethylditetradecylammonium salts, diethyldihexadecylammonium salts, and diethyldioctadecylammonium salts; dibutyldialkylammonium salts such as dibutyldidodecylammonium salts, dibutylditetradecylammonium salts, dibutyldihexadecylammonium salts, and dibutyldioctadecylammonium salts; methylbenzyldialkylammonium salts such as methylbenzyldihexadecylammonium salts; dibenzyldialkylammonium salts such as dibenzyldihexadecylammonium salts; trialkylmethylammonium salts such as tridodecylmethylammonium salts, tritetradecylmethylammonium salts, and trioctadecylmethylammonium salts; trialkylethylammonium salts such as tridodecylethylammonium salts; trialkylbutylammonium salts such as tridodecylbutylammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, and 18-aminooctadecanoic acid. The organic swelling agent employed may be an ammonium salt containing a hydroxyl group and/or an ether group; in particular, a quaternary ammonium salt containing at least one alkylene glycol residue, such as a methyldialkyl(PAG)ammonium salt, an ethyldialkyl(PAG)ammonium salt, a butyldialkyl(PAG)ammonium salt, a dimethylbis(PAG)ammonium salt, a diethylbis(PAG)ammonium salt, a dibutylbis(PAG)ammonium salt, a methylalkylbis(PAG)ammonium salt, an ethylalkylbis(PAG)ammonium salt, a butylalkylbis(PAG)ammonium salt, a methyltri(PAG)ammonium salt, an ethyltri(PAG)ammonium salt, a butyltri(PAG)ammonium salt, or a tetra(PAG)ammonium salt (wherein "alkyl" represents an alkyl group having 12 or more carbon atoms, such as dodecyl, tetradecyl, hexadecyl, octadecyl, or eicosyl; and "PAG" represents a polyalkylene glycol residue, preferably a polyethylene glycol or polypropylene glycol residue having 20 or less carbon atoms). Among the aforementioned organic swelling agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, and dimethylditallowammonium salts. These organic swelling agents may be employed singly or in combination of two or more species.

In the present invention, a layered silicate salt treated with an organic swelling agent is added to the polyester amide compound in an amount of preferably 0.5 to 8 parts by mass, more preferably 1 to 6 parts by mass, much more preferably 2 to 5 parts by mass, on the basis of 100 parts by mass of the polyester amide compound. When the amount of the layered silicate salt added is less than 0.5 parts by mass, the effect of improving gas barrier property is lowered, which is not preferred, whereas when the amount of the layered silicate salt added exceeds 8 parts by mass, the resultant gas barrier layer becomes turbid, and the transparency of a container including the layer is deteriorated, which is not preferred.

In the polyester amide composition, preferably, the layered silicate salt is not locally aggregated, but is uniformly dispersed. As used herein, the expression "uniform dispersion" refers to the case where the layered silicate salt is separated into flat layers in the polyester amide composition, and 50% or more of the separated layers have an interlayer distance of 5 nm or more. As used herein, the term "interlayer distance" refers to the distance between the gravity centers of adjacent flat layers. When the interlayer distance is large, a good dispersion state is attained, a favorable appearance such as transparency is achieved, and gas barrier property against oxygen, carbon dioxide gas, etc. can be improved.

3-1-3. Gelation Preventing Agent and Fish Eye Reducing Agent

In the polyester amide composition of the present invention, preferably, the polyester amide compound is mixed with one or more carboxylic acid salts selected from among sodium acetate, calcium acetate, magnesium acetate, calcium stearate, magnesium stearate, sodium stearate, and derivatives thereof. Examples of the derivatives include 12-hydroxystearic acid metal salts, such as calcium 12-hydroxystearate, magnesium 12-hydroxystearate, and sodium 12-hydroxystearate. When any of the aforementioned carboxylic acid salts is added to the polyester amide compound, gelation of the polyester amide compound can be prevented during molding, and formation of fish eyes can be suppressed in a molded product; i.e., the polyester amide composition exhibits improved moldability.

When any of the aforementioned carboxylic acid salts is added to the polyester amide compound, the carboxylic acid salt concentration of the polyester amide composition is preferably 400 to 10,000 ppm, more preferably 800 to 5,000 ppm, much more preferably 1,000 to 3,000 ppm. When the carboxylic acid salt concentration is 400 ppm or more, thermal degradation of the polyester amide compound can be suppressed, and gelation thereof can be prevented. When the carboxylic acid salt concentration is 10,000 ppm or less, molding failure of the polyester amide composition is prevented, and also the composition is prevented from being colored or whitened. Conceivably, when a carboxylic acid salt, which is a basic substance, is present in a molten polyester amide compound, thermal denaturation of the polyester amide compound is retarded, and generation of a gel, which is considered to be a finally denatured product of the compound, is suppressed. Any of the aforementioned carboxylic acid salts exhibits excellent handleability. Particularly, a stearic acid metal salt is preferred, since it is inexpensive, exhibits a lubricating effect, and realizes more stable molding. No particular limitation is imposed on the form of a carboxylic acid salt employed. However, preferably, the carboxylic acid salt is in the form of powder having a small particle size, since the carboxylic acid salt having such a powdery form is readily uniformly dispersed in the polyester amide composition when being dry-mixed therewith. The particle size is preferably 0.2 mm or less.

3-1-4. Antioxidant

The polyester amide composition of the present invention preferably contains an antioxidant, in order to control oxygen-absorbing performance, and to suppress deterioration of mechanical properties. Examples of the antioxidant include a copper-containing antioxidant, a hindered phenol antioxidant, a hindered amine antioxidant, a phosphorus-containing antioxidant, and a thio-containing antioxidant. Particularly, a hindered phenol antioxidant and a phosphorus-containing antioxidant are preferred.

Specific examples of the hindered phenol antioxidant include triethylene glycol-bis[3-(3-t-butyl-5-methyl-4-hydroxyphenyl) propionate, 4,4'-butylidenebis(3-methyl-6-t-butylphenol), 1,6-hexanediol-bis[3-(3,5-di-t-butyl-4-hydroxyphenyl) propionate, 2,4-bis(n-octylthio)-6-(4-hydroxy-3,5-di-t-butylanilino)-1,3,5-triazine, pentaerythrityl-tetraxis[3-(3,5-di-t-butyl-4-hydroxyphenyl) propionate], 2,2-thio-diethylenebis[3-(3,5-di-t-butyl-4-hydroxyphenyl) propionate], octadecyl-3-(3,5-di-t-butyl-4-hydroxyphenyl) propionate, 2,2-thiobis(4-methyl-6-1-butylphenol), N,N'-hexamethylenebis(3,5-di-t-butyl-4-hydroxy-hydroxynamide), 3,5-di-t-butyl-4-hydroxybenzyl phosphonate-diethyl ester, 1,3,5-trimethyl-2,4,6-tris(3,5-di-butyl-4-hydroxybenzyl)benzene, bis(ethyl 3,5-di-t-butyl-4-hydroxybenzylsulfonate)calcium, tris-(3,5-di-t-butyl-4-hydroxybenzyl)-isocyanurate, 2,6-di-t-butyl-p-cresol, butylated hydroxyanisol, 2,6-di-t-butyl-4-ethylphenol, stearyl-β-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio) methyl]-O-cresol, isooctyl-3-(3,5-di-t-butyl-4-hydroxyphenyl) propionate, 4,4'-butylidenebis(3-methyl-6-t-butylphenol), 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-T-butylphenyl)butyric acid]glycol ester, 1,3,5-tris(3',5'-di-t-butyl-4'-hydroxybenzyl)-sec-triazine-2,4,6-(1H,3H,5H) trione, and d-α-tocopherol. These antioxidants may be employed singly or in combination. Specific examples of commercially available hindered phenol compounds include Irganox 1010 (trade name) and Irganox 1098 (trade name), which are products of BASF.

Specific examples of the phosphorus-containing antioxidant include organic phosphorus compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris (2,4-di-tert-butylphenyl) phosphite, di stearylpentaerythritol diphosphite, tetra(tridecyl-4,4'-isopropylidenediphenyl diphosphite, and 2,2-methylenebis(4,6-di-tert-butylphenyl) octyl phosphite. These compounds may be employed singly or in combination.

No particular limitation is imposed on the antioxidant content of the polyester amide composition, so long as the respective performances of the composition are not impaired. However, in order to control oxygen-absorbing performance, and to suppress deterioration of mechanical properties, the antioxidant content is preferably 0.001 to 3 parts by mass, more preferably 0.01 to 1 part by mass, on the basis of 100 parts by mass of the polyester amide compound of the present invention.

3-1-5. Impact-Resistance-Improving Material

The amide composition of the polyester amide of the present invention may contain an impact-resistance-improving material, for improvement of impact resistance, pinhole resistance of film, and flexibility. Examples of the impact-resistance-improving material which may be added include polyolefin, polyamide elastomer, hydrogenated styrene-butadiene copolymer resin, ionomer, ethylene-ethyl acrylate copolymer resin, maleic-anhydride-modified ethylene-ethyl acrylate copolymer resin, ethylene-methacrylic acid copolymer resin, nylon 6,66,12, nylon 12, nylon 12 elastomer, ethylene-propylene copolymer elastomer, and polyester elastomer. The amount of the impact-resistance-improving material added is preferably 1 to 10 mass %, more preferably 1 to 5 mass %, particularly preferably 2 to 3 mass %. When the amount of the impact-resistance-improving material added is large, transparency and gas barrier property may be deteriorated, whereas when the amount of the impact-resistance-improving material added is small, impact resistance, pinhole resistance of film, and flexibility may be less improved.

3-2. Resin

In consideration of the intended use or performance of the polyester amide compound of the present invention, the polyester amide compound may be mixed with any resin, to thereby prepare a polyester amide composition. No particular limitation is imposed on the resin which may be mixed with the polyester amide compound of the present invention. However, preferably, the resin is at least one species selected from the group consisting of a polyolefin, a polyester, a polyamide, polyvinyl alcohol, and a plant-derived resin.

Of these, a resin exhibiting high oxygen barrier property, such as a polyester, a polyamide, or polyvinyl alcohol is preferably blended with the polyester amide compound, in order to effectively achieve an oxygen-absorbing effect.

Mixing of such a resin with the polyester amide compound of the present invention may be carried out through a conventionally known method. Preferably, melt-mixing is carried out. When the polyester amide compound of the present invention is melt-mixed with the resin for production of intended pellets or an intended molded product, melt-blending may be carried out by means of, for example, an extruder. The extruder employed may be a single-screw or twin-screw extruder. In order to achieve effective mixing, a twin-screw extruder is preferably employed. Examples of the screw employed for melting include, but are not limited to, known screws such as a so-called screw for nylon or polyolefin, a slow compression screw, a rapid compression screw, a single-flight screw, and a double-flight screw.

3-2-1. Polyolefin

Specific examples of the polyolefin include olefin homopolymers, such as polyethylene, polypropylene, polybutene-1, and poly-4-methylpentene-1; ethylene-α-olefin copolymers, such as ethylene-propylene random copolymer, ethylene-propylene block copolymer, ethylene-propylene-polybutene-1 copolymer, and ethylene-cyclic olefin copolymer; other ethylene copolymers, such as ethylene-α,β-unsaturated carboxylic acid copolymer, ethylene-α,β-unsaturated carboxylic acid ester copolymer, ion-crosslinked ethylene-α,β-unsaturated carboxylic acid copolymer, ethylene-vinyl acetate copolymer, and partially or completely saponified ethylene-vinyl acetate copolymer; and grafted polyolefins formed through graft modification of these polyolefins with an acid anhydride such as maleic anhydride.

3-2-2. Polyester

As used herein, the term "polyester" refers to a polyester formed of one or more species selected from among polycarboxylic acids, including dicarboxylic acids, and esterifiable derivatives of the polycarboxylic acids, and one or more species selected from among polyhydric alcohols, including glycols; a polyester formed of a hydroxycarboxylic acid or an esterifiable derivative thereof; or a polyester formed of a cyclic ester.

Examples of the dicarboxylic acid include saturated aliphatic dicarboxylic acids such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimer acid, and esterifiable derivatives of these acids; unsaturated aliphatic dicarboxylic acids such as fumaric acid, maleic acid, and itaconic acid, and esterifiable derivatives of these acids; aromatic dicarboxylic acids such as o-phthalic acid, isophthalic acid, terephthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenyl sulfone dicarboxylic acid, 4,4'-biphenyl ether dicarboxylic acid, 1,2-bis(phenoxy)ethane-p,p'-dicarboxylic acid, pamoic acid, and anthracenedicarboxylic acid, and esterifiable derivatives of these acids; and aromatic dicarboxylic acids containing a metal sulfonate group, such as 5-sodium sulfoisophthalic acid, 2-sodium sulfoterephthalic acid, 5-lithium sulfoisophthalic acid, 2-lithium sulfoterephthalic acid, 5-potassium sulfoisophthalic acid, and 2-potassium sulfoterephthalic acid, and lower alkyl ester derivatives of these acids.

Among the aforementioned dicarboxylic acids, particularly, terephthalic acid, isophthalic acid, or naphthalenedicarboxylic acid is preferably employed, from the viewpoints of, for example, physical properties of the resultant polyester. Optionally, a dicarboxylic acid other than the aforementioned ones may be employed for copolymerization.

Examples of polycarboxylic acids other than the aforementioned dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and esterifiable derivatives thereof.

Examples of the glycol include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxy)benzene, 1,4-bis(β-hydroxyethoxyphenyl) sulfone, bis(p-hydroxyphenyl) ether, bis(p-hydroxyphenyl) sulfone, bis(p-hydroxyphenyl) methane, 1,2-bis(p-hydroxyphenyl)ethane, bisphenol A, bisphenol C, 2,5-naphthalenediol, and glycols formed through addition of ethylene oxide to these glycols.

Among the aforementioned glycols, particularly, ethylene glycol, 1,3-propylene glycol, 1,4-butylene glycol, or 1,4-cyclohexanedimethanol is preferably employed as a main component. Examples of polyhydric alcohols other than the aforementioned glycols include trimethylolmethane, trimethylolethane, trimethylolpropane, pentaerythritol, glycerol, and hexanetriol. Examples of the hydroxycarboxylic acid include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and esterifiable derivatives thereof.

Examples of the cyclic ester include ε-caprolactone, β-propiolactone, β-methyl-β-propiolactone, δ-valerolactone, glycolide, and lactide.

Examples of esterifiable derivatives of polycarboxylic acids and hydroxycarboxylic acids include alkyl esters, acid chlorides, and acid anhydrides of these carboxylic acids.

The polyester employed in the present invention is preferably a polyester containing, as a main acid component, terephthalic acid or an esterifiable derivative thereof, or naphthalenedicarboxylic acid or an esterifiable derivative thereof, and containing, as a main glycol component, an alkylene glycol.

In the polyester containing, as a main acid component, terephthalic acid or an esterifiable derivative thereof, the amount of terephthalic acid or an esterifiable derivative thereof is preferably 70 mol % or more, more preferably 80 mol % or more, much more preferably 90 mol % or more, with respect to the total amount of acid components. Similarly, in the polyester containing, as a main acid component, naphthalenedicarboxylic acid or an esterifiable derivative thereof, the amount of naphthalenedicarboxylic acid or an esterifiable derivative thereof is preferably 70 mol % or more, more preferably 80 mol % or more, much more preferably 90 mol % or more, with respect to the total amount of acid components.

Examples of naphthalenedicarboxylic acids or esterifiable derivatives thereof which are preferably employed in the present invention include 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid, which are exemplified above; and esterifiable derivatives of these naphthalenedicarboxylic acids.

In the polyester containing, as a main glycol component, an alkylene glycol, the amount of the alkylene glycol is preferably 70 mol % or more, more preferably 80 mol % or more, much more preferably 90 mol % or more, with respect to the total amount of glycol components. The alkylene glycol employed in the present invention may have, in its molecular chain, a substituent or an alicyclic structure.

The copolymerization component other than the aforementioned terephthalic acid/ethylene glycol is preferably at least one species selected from the group consisting of isophthalic acid, 2,6-naphthalenedicarboxylic acid, diethylene glycol, neopentyl glycol, 1,4-cyclohexanedimethanol, 1,2-propanediol, 1,3-propanediol, and 2-methyl-1,3-propanediol, for achieving both transparency and moldability. Particularly, the copolymerization component is more preferably at least one species selected from the group consisting of isophthalic acid, diethylene glycol, neopentyl glycol, and 1,4-cyclohexanedimethanol.

The polyester employed in the present invention is preferably a polyester having a main repeating unit formed of ethylene terephthalate, more preferably a linear polyester having an ethylene terephthalate unit in an amount of 70 mol % or more, much more preferably a linear polyester having an ethylene terephthalate unit in an amount of 80 mol % or more, particularly preferably a linear polyester having an ethylene terephthalate unit in an amount of 90 mol % or more.

Alternatively, the polyester employed in the present invention is preferably a polyester having a main repeating unit formed of ethylene 2,6-naphthalate, more preferably a linear polyester having an ethylene 2,6-naphthalate unit in an amount of 70 mol % or more, much more preferably a linear polyester having an ethylene 2,6-naphthalate unit in an amount of 80 mol % or more, particularly preferably a linear polyester having an ethylene 2,6-naphthalate unit in an amount of 90 mol % or more.

Examples of other preferred polyesters employed in the present invention include a linear polyester having a propylene terephthalate unit in an amount of 70 mol % or more, a linear polyester having a propylene naphthalate unit in an amount of 70 mol % or more, a linear polyester having a 1,4-cyclohexanedimethylene terephthalate unit in an amount of 70 mol % or more, a linear polyester having a butylene naphthalate unit in an amount of 70 mol % or more, and a linear polyester having a butylene terephthalate unit in an amount of 70 mol % or more.

Particularly, the composition of the entire polyester is preferably a combination of terephthalic acid/isophthalic acid//ethylene glycol, a combination of terephthalic acid//ethylene glycol/1,4-cyclohexanedimethanol, or a combination of terephthalic acid//ethylene glycol/neopentyl glycol, for achieving both transparency and moldability. Needless to say, the polyester may contain a small amount (5 mol % or less) of diethylene glycol, which may be formed through dimerization of ethylene glycol during esterification (ester exchange) reaction or polycondensation reaction.

Examples of other preferred polyesters employed in the present invention include polyglycolic acid, which is formed through polycondensation of glycolic acid or methyl glycolate, or through ring-opening polycondensation of glycolide. The polyglycolic acid may be copolymerized with another component such as lactide.

3-2-3. Polyamide

Examples of the polyamide which may be employed in the present invention include a polyamide having, as a main structural unit, a unit derived from a lactam or an aminocarboxylic acid; an aliphatic polyamide having, as a main structural unit, a unit derived from an aliphatic diamine and an aliphatic dicarboxylic acid; a partially aromatic polyamide having, as a main structural unit, a unit derived from an aliphatic diamine and an aromatic dicarboxylic acid; and a partially aromatic polyamide having, as a main structural unit, a unit derived from an aromatic diamine and an aliphatic dicarboxylic acid. Such a polyamide may optionally be copolymerized with a monomer unit other than the main structural unit.

Examples of the lactam or aminocarboxylic acid which may be employed include lactams such as c-caprolactam and laurolactam; aminocarboxylic acids such as aminocaproic acid and aminoundecanoic acid; and aromatic aminocarboxylic acids such as p-aminomethylbenzoic acid.

Examples of the aliphatic diamine which may be employed include a C2 to C12 aliphatic diamine and a functional derivative thereof. An alicyclic diamine may also be employed. The aliphatic diamine may be a linear aliphatic diamine or a branched aliphatic diamine. Specific examples of the linear aliphatic diamine include aliphatic diamines such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine. Specific examples of the alicyclic diamine include cyclohexanediamine, 1,3-bis(aminomethyl)cyclohexane, and 1,4-bis(aminomethyl)cyclohexane.

The aforementioned aliphatic dicarboxylic acid is preferably a linear aliphatic dicarboxylic acid or an alicyclic dicarboxylic acid, particularly preferably a linear aliphatic dicarboxylic acid having a C4 to C12 alkylene group. Examples of such a linear aliphatic dicarboxylic acid include adipic acid, sebacic acid, malonic acid, succinic acid, glutaric acid, pimelic acid, suberic acid, azelaic acid, undecanoic acid, undecanedioic acid, dodecanedioic acid, dimer acid, and functional derivatives thereof. Examples of the alicyclic dicarboxylic acid include alicyclic dicarboxylic acids such as 1,4-cyclohexanedicarboxylic acid, hexahydroterephthalic acid, and hexahydroisophthalic acid.

Examples of the aforementioned aromatic diamine include m-xylylenediamine, p-xylylenediamine, and p-bis(2-aminoethyl)benzene.

Examples of the aforementioned aromatic dicarboxylic acid include terephthalic acid, isophthalic acid, phthalic acid, 2,6-naphthalenedicarboxylic acid, diphenyl-4,4'-dicarboxylic acid, diphenoxyethanedicarboxylic acid, and functional derivatives thereof.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly-m-xylylene adipamide (polyamide MXD6), isophthalic-acid-copolymerized poly-m-xylylene adipamide (polyamide MXD6I), poly-m-xylylene sebacamide (polyamide MXD10), poly-m-xylylene dodecanamide (polyamide MXD12), poly-1,3-bisaminocyclohexane adipamide (polyamide BAC6), and poly-p-xylylene sebacamide (polyamide PXD 10). More preferred polyamides are polyamide 6, polyamide MXD6, and polyamide MXD6I.

The aforementioned polyamide may employ, as a copolymerization component, a polyether having at least one terminal amino group or terminal carboxyl group and having a number average molecular weight of 2,000 to 20,000, an organic carboxylic acid salt of the polyether having a terminal amino group, or an amino salt of the polyether having a terminal carboxyl group. Specific examples include bis(aminopropyl) poly(ethylene oxide) (polyethylene glycol having a number average molecular weight of 2,000 to 20,000).

The aforementioned partially aromatic polyamide may have a structural unit derived from a tri- or more-valent polycarboxylic acid such as trimellitic acid or pyromellitic acid, so long as the polyamide is in a substantially linear form.

The aforementioned polyamide may be fundamentally produced through a conventionally known method, such as melt polycondensation in the presence of water, melt polycondensation in the absence of water, or solid-phase polymerization of a polyamide obtained through such a melt polycondensation method. The melt polycondensation reaction may be carried out through a single step or multiple steps. The melt polycondensation reaction may be carried out by means of a batch-type reactor or a continuous-type reactor. The melt polycondensation step and the solid-phase polymerization step may be carried out continuously or separately.

3-2-4. Polyvinyl Alcohol

Specific examples of the polyvinyl alcohol include polyvinyl alcohol, an ethylene-vinyl alcohol copolymer, and a partially or completely saponified ethylene-vinyl alcohol copolymer. The polyvinyl alcohol may be a modified product of such a copolymer.

3-2-5. Plant-Derived Resin

Specific examples of the plant-derived resin include, but are not particularly limited to, known aliphatic polyester biodegradable resins formed of various materials other than petroleum, some of which overlap with the aforementioned resins. Examples of the aliphatic polyester biodegradable resin include poly($\alpha$-hydroxy acids) such as polyglycolic acid (PGA) and polylactic acid (PLA); and polyalkylene alkanoates such as polybutylene succinate (PBS) and polyethylene succinate (PES).

3-3. Metal

When the polyester amide compound of the present invention requires further oxygen-absorbing performance in addition to oxygen-absorbing effect, one or more metal atoms selected from among Group VIII metals of the periodic table such as iron, cobalt, and nickel; Group I metals such as copper and silver; Group IV metals such as tin, titanium, and zirconium; Group V metals such as vanadium; Group VI metals such as chromium; and Group VII metals such as manganese may be added in the form of a compound or a metal complex before or during polycondensation reaction or during extrusion molding. Of these metal atoms, a Group VIII metal atom is preferred, with a cobalt atom being more preferred, from the viewpoint of oxygen-absorbing performance.

In the present invention, when any of the aforementioned metal atoms is added to and mixed with the polyester amide compound, a compound containing the metal atom (hereinafter may be referred to as a "metal catalyst compound") is preferably employed. Such a metal catalyst compound may be employed in the form of a low-valent inorganic acid salt, organic acid salt, or complex salt of the metal atom.

Examples of the inorganic acid salt include halides such as chloride and bromide; sulfur oxyacid salts such as sulfate; nitrogen oxyacid salts such as nitrate; phosphorus oxyacid salts such as phosphate; and silicates. Examples of the organic acid salt include carboxylic acid salts, sulfonic acid salts, and phosphonic acid salts. Of these, a carboxylic acid salt is preferably employed for attaining the object of the present invention. Specific examples of the carboxylic acid salt include transition metal salts of, for example, acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid, and naphthenic acid.

A metal complex with, for example, a $\beta$-diketone or a $\beta$-keto acid ester may also be employed. Examples of the $\beta$-diketone or $\beta$-keto acid ester which may be employed include acetylacetone, ethyl acetoacetate, 1,3-cyclohexadione, methylenebis-1,3-cyclohexadione, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis(cyclohexanoyl)-methane, and dipivaloylmethane.

Of these, a carboxylic acid salt, halide, or acetylacetonate complex containing any of the aforementioned metal atoms is preferably employed, since it exhibits favorable oxygen-absorbing function.

One or more of the aforementioned metal catalyst compounds may be added. Particularly, a metal catalyst compound containing a cobalt atom exhibits excellent oxygen-absorbing function and thus is preferably employed. Particularly preferred is cobalt (II) stearate or cobalt (II) acetate, which is in the form of solid or powder and exhibits excellent handleability during melt mixing.

No particular limitation is imposed on the amount of the metal atom added to the polyester amide compound. However, the amount of the metal atom is preferably 1 to 1,000 ppm, more preferably 1 to 700 ppm, on the basis of 100 parts by mass of the polyester amide compound. When the amount of the metal atom added is 1 ppm or more, the polyester amide compound of the present invention exhibits an oxygen-absorbing effect and also a sufficient oxygen-absorbing function, and a packaging material produced from the polyester amide compound exhibits improved oxygen barrier property. No particular limitation is imposed on the method for adding a metal catalyst compound to the polyester amide compound, and addition of the metal catalyst compound may be carried out through any method.

3-4. Oxidizable Organic Compound

The polyester amide composition may further contain an oxidizable organic compound.

The oxidizable organic compound is preferably an organic compound which is oxidized in an oxygen-containing atmosphere spontaneously or in the presence of any one of a catalyst, heat, light, water, etc. and which has an active carbon atom that facilitates removal of hydrogen. Specific examples of such an active carbon atom include a carbon atom adjacent to a carbon-carbon double bond, a tertiary carbon atom to which a carbon side chain is bonded, and a carbon atom of an active methylene group.

Examples of the oxidizable organic compound include vitamin C and vitamin E. Other examples of the oxidizable organic compound include a polymer having in the molecule a readily oxidizable tertiary hydrogen atom, such as polypropylene; and a polymer formed of or containing a compound having in the molecule a carbon-carbon double bond, such as butadiene, isoprene, or cyclohexanone. Of these, preferred is a compound or polymer having a carbon-carbon double bond, and more preferred is a C4 to C20 compound having a carbon-carbon double bond, or an oligomer or polymer having a unit derived from the C4 to C20 compound, from the viewpoints of oxygen-absorbing performance and processability.

Examples of C4 to C20 compound having a carbon-carbon double bond include conjugated dienes such as butadiene and isoprene; chain-form non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, and dicyclopentadiene; trienes such as 2,3-diisopropylidene-5-norbornene, 2-ethylidene-3-isopropylidene-5-norbornene, and 2-propenyl-2,2-norbornadiene; and chloroprene.

These compounds, which may be employed singly or in combination of two or more species, or employed in combination with another monomer, are incorporated into, for example, a homopolymer, a random copolymer, or a block copolymer.

Examples of the monomer which may be employed in combination include C2 to C20 α-olefins such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. Examples of other employable monomers include styrene, vinyltoluene, acrylonitrile, methacrylonitrile, vinyl acetate, methyl methacrylate, and ethyl acrylate.

Specific examples of the oligomer or polymer having a unit derived from a C4 to C20 compound having a carbon-carbon double bond include, but are not limited to, polybutadiene (BR), polyisoprene (IR), butyl rubber (IIR), natural rubber, nitrile-butadiene rubber (NBR), styrene-butadiene rubber (SBR), chloroprene rubber (CR), and ethylene-propylene-diene rubber (EPDM). No particular limitation is imposed on the carbon-carbon double bond present in the polymer, and the double bond may be present in the form of a vinylene group on the main chain or in the form of a vinyl group on a side chain.

Preferably, the aforementioned oligomer or polymer having a unit derived from a compound having a carbon-carbon double bond has a carboxylic acid group, carboxylic acid anhydride group, or hydroxyl group incorporated into the molecule, or the oligomer or the polymer is blended with an oligomer or polymer modified with any of the aforementioned functional groups. Examples of the monomer employed for incorporation of such a functional group include an ethylenic unsaturated monomer having a functional group such as a carboxylic acid group, a carboxylic acid anhydride group, a carboxylic acid salt group, a carboxylic acid ester group, a carboxylic acid amide group, a carbonyl group, or a hydroxyl group.

Such a monomer is preferably an unsaturated carboxylic acid or a derivative thereof. Specific examples include cal-unsaturated carboxylic acids such as acrylic acid, methacrylic acid, maleic acid, fumaric acid, itaconic acid, citraconic acid, and tetrahydrophthalic acid; unsaturated carboxylic acids such as bicyclo[2,2,1]hept-2-ene-5,6-dicarboxylic acid; α,β-unsaturated carboxylic acid anhydrides such as maleic anhydride, itaconic anhydride, citraconic anhydride, and tetrahydrophthalic anhydride; and unsaturated carboxylic acid anhydrides such as bicyclo[2,2,1]hept-2-ene-5,6-dicarboxylic anhydride.

The acid-modified oligomer or polymer having a unit derived from a compound having a carbon-carbon double bond is produced through graft copolymerization between the oligomer or the polymer and an unsaturated carboxylic acid or a derivative thereof by means of a known technique. Alternatively, the acid-modified oligomer or polymer may be produced through random copolymerization between any of the aforementioned compounds having a carbon-carbon double bond and an unsaturated carboxylic acid or a derivative thereof.

The amount of the oxidizable organic compound contained in the polyester amide composition is preferably 0.01 to 10 mass %, more preferably 0.1 to 8 mass %, much more preferably 0.5 to 5 mass %, for improvement of oxygen-absorbing performance and transparency.

4. Application of Polyester Amide Compound and Polyester Amide Composition

The polyester amide compound or polyester amide composition of the present invention can be employed for any application requiring oxygen barrier property or oxygen-absorbing performance. For example, the polyester amide compound of the present invention may be employed as an oxygen-absorbing agent by charging it alone in a container such as a packet.

Typical examples of applications of the polyester amide compound or polyester amide composition of the present invention include, but are not limited to, molded products such as packaging materials and packaging containers. The polyester amide compound or polyester amide composition of the present invention may be processed and employed as at least a portion of such a molded product. For example, the polyester amide compound or polyester amide composition of the present invention may be employed as at least a portion of a film-like or sheet-like packaging material, or may be employed as at least a portion of a packaging container; for example, a bottle, a tray, a cup, a tube, a flat bag, or a pouch such as a standing pouch. The structure of a such a molded product; i.e., a packaging material or a packaging container, may be a single-layer structure including a layer formed of the polyester amide compound or polyester amide composition of the present invention, or may be a multi-layer structure including the layer formed of the polyester amide compound or the polyester amide composition and a layer formed of another thermoplastic resin. No particular limitation is imposed on the thickness of the layer formed of the polyester amide compound or polyester amide composition of the present invention, but the thickness is preferably 1 μm or more.

No particular limitation is imposed on the method for producing a molded product such as a packaging material or a packaging container, and any method may be employed. For example, a film-like, sheet-like, or tube-like packaging material may be produced by melting the polyester amide compound or the polyester amide composition by means of a T-die, a circular die, or a similar apparatus, and extruding the thus-melted compound or composition through an extruder attached to the apparatus. A film-like molded product produced through the aforementioned method may be processed into a stretched film by stretching the molded product. A bottle-shaped packaging container may be produced by injecting the molten polyester amide compound or polyester amide composition from an injection molding machine into a mold, to thereby produce a preform, and then heating the preform to a stretching temperature, followed by blow stretching.

A container such as a tray or a cup may be produced by injecting the molten polyester amide compound or polyester amide composition from an injection molding machine into a mold, or by subjecting a sheet-like packaging material to a molding technique such as vacuum molding or pressure molding. Such a packaging material or packaging container may be produced through a variety of methods other than the aforementioned production methods.

A packaging material or packaging container produced from the polyester amide compound or polyester amide composition of the present invention is suitably employed for storing or preserving a variety of products. For example, the packaging material or the packaging container can be employed for storing or preserving various products, including beverages, seasonings, food grains, liquid and solid processed foods requiring aseptic packaging or heat sterilization, chemicals, liquid commodities, pharmaceuticals, semiconductor integrated circuits, and electronic devices.

EXAMPLES

The present invention will next be described in more detail by way of examples, which should not be construed as limiting the invention thereto.

The below-described methods were employed for determining the compositional proportions of components of each of the polyester amide compounds and polyester compounds produced in Examples and Comparative Examples, the intrinsic viscosity thereof, and the melting point thereof. Also, the amount of oxygen absorption was determined through the below-described method.

(1) Compositional Proportions of Components

The compositional proportions of components of a copolymer were determined by means of a $^1$H-NMR apparatus (400 MHz, trade name: JNM-AL400, product of JEOL Ltd., measurement mode: NON($^1$H)). Specifically, a 5 mass % solution of a polyester amide compound or a polyester compound was prepared by use of trifluoroacetic acid-d serving as a solvent, and the thus-prepared solution was subjected to $^1$H-NMR measurement.

(2) Intrinsic Viscosity 0.5 g Of a polyester amide compound or a polyester compound was dissolved, under heating, in 120 g of a solvent mixture of phenol/1,1,2,2-tetrachloroethane (ratio by mass=6 : 4), and the resultant solution was subjected to filtration and then cooled to 25° C., to thereby prepare a measurement sample. The intrinsic viscosity of the sample was measured at 25° C. by means of an automatic capillary viscometer (trade name: SS-300-L1, product of Shibayama Scientific Co., Ltd.).

(3) Melting Point

Melting point (Tm) was determined through DSC measurement (differential scanning calorimetry) under a stream of nitrogen by means of a differential scanning calorimeter (trade name: DSC-60, product of Shimadzu Corporation) at a temperature elevation rate of 10° C./min.

(4) Amount of Oxygen Absorption 2 g of a pulverized sample and a cotton fabric impregnated with 10 mL of water were added to a three-side-sealed bag formed of an aluminum-foil-laminated film and having a size of 25 cm×18 cm, and the bag was sealed so that the air content of the bag was adjusted to 400 mL. The humidity in the bag was adjusted to 100% RH (relative humidity). The sample was stored in the bag for 28 days at 40° C., and then the oxygen concentration in the bag was determined by means of an oxygen concentration meter (trade name: LC-700F, product of Toray Engineering Co., Ltd.), and the amount of oxygen absorption (cc/g) was calculated on the basis of the thus-determined oxygen concentration. The higher the amount of oxygen absorption, the higher the oxygen-absorbing performance.

Examples 1 to 6

(Polymerization of Polyester Amide Compound)

An organic tetrabutyl titanate (TBT) catalyst, terephthalic acid, ethylene glycol, and DL-alanine were added in amounts shown in Table 1 to an esterification reactor, and esterification reaction was allowed to proceed under stirring at about 240° C. and about 0.3 MPa for three hours. The reaction mixture was transferred to a polycondensation vessel, and a catalyst shown in Table 1 was added thereto. Thereafter, while the reaction mixture was heated with stirring under a stream of nitrogen, excess ethylene glycol was removed through evaporation to the outside of the reaction system, and then polycondensation was carried out under the reaction conditions shown in Table 1, to thereby produce a polyester amide compound.

FIG. 1 is a $^1$H-NMR chart of the polyester amide compound produced in Example 1.

FIG. 1 shows the integrated intensity of absorption peak a; i.e., an absorption peak at around 1.3 to 1.7 ppm, which is attributed to hydrogen of the methyl group of DL-alanine. FIG. 1 also shows the integrated intensity of absorption peak b; i.e., an absorption peak at around 4.7 ppm, which is attributed to hydrogen of a methylene group of ethylene glycol. FIG. 1 also shows the integrated intensity of absorption peak c; i.e., an absorption peak at around 7.9 to 8.4 ppm, which is attributed to hydrogen of the aromatic ring of terephthalic acid.

The amount of a DL-alanine unit contained in the polyester amide compound is calculated by use of the following formula.

$$\text{Amount of } DL\text{-alanine unit in polyester amide compound (mol \%)} = \frac{(a/3)}{(a/3)+(b/4)+(c/4)} \times 100$$

On the basis of the aforementioned calculation, the polyester amide compound produced in Example 1 was found to contain a DL-alanine unit in an amount of about 3.2 mol % (calculation value: 3.1 mol %). The mole fractions of the respective structural units of the polyester amide compound produced in Example 1 were found to be as follows:

ethylene glycol unit/terephthalic acid unit/DL-alanine unit=48.4/48.4/3.2 (mol %).

In a manner similar to that described above, the compositional proportions of components of each of the polyester amide compounds and polyester compounds prepared in the other Examples and Comparative Examples were determined.

Example 7

The procedure of Example 3 was repeated, except that DL-alanine was replaced with DL-2-aminobutyric acid, to thereby produce a polyester amide compound.

Example 8

The procedure of Example 3 was repeated, except that DL-alanine was replaced with DL-phenylalanine, to thereby produce a polyester amide compound.

Example 9

The procedure of Example 3 was repeated, except that the amount of TBT was changed to 50 ppm, and the reaction time was changed to two hours, to thereby produce a polyester amide compound.

Example 10

The procedure of Example 3 was repeated, except that the amount of TBT was changed to 150 ppm, the maximum resin temperature was changed to 265° C., and the reaction time was changed to five hours, to thereby produce a polyester amide compound.

Comparative Example 1

(Polymerization of Polyester Compound)

Terephthalic acid and ethylene glycol were added in amounts shown in Table 1 to an esterification reactor, and esterification reaction was allowed to proceed under stirring at about 240° C. and about 0.3 MPa for three hours. The reaction mixture was transferred to a polycondensation vessel, and a catalyst shown in Table 1 was added thereto. Thereafter, while the reaction mixture was heated with stirring under a stream of nitrogen, excess ethylene glycol was removed through evaporation to the outside of the reaction system, and then polycondensation was carried out under the reaction conditions shown in Table 1, to thereby produce a polyester compound.

Comparative Example 2

The procedure of Example 3 was repeated, except that DL-alanine was replaced with 2-aminoisobutyric acid, which does not have a hydrogen atom at a-position, to thereby produce a polyester amide compound.

The polyester compound which is not copolymerized with an a-amino acid does not exhibit oxygen-absorbing performance (Comparative Example 1). Also, the polyester amide compound copolymerized with 2-aminoisobutyric acid, which is an α-amino acid having no tertiary hydrogen, does not exhibit oxygen-absorbing performance

Comparative Example 2

In contrast, the polyester amide compound copolymerized with an a-amino acid having tertiary hydrogen (polyester amide resin or polyester amide oligomer) exhibits sufficient oxygen-absorbing performance without containing a metal, and does not generate an unpleasant odor (Examples 1 to 10).

Industrial Applicability

The polyester amide compound or polyester amide composition of the present invention exhibits excellent oxygen-absorbing performance. When the polyester amide compound or polyester amide composition of the present invention is employed for producing a packaging material or a packaging container, the packaging material or the packaging container exhibits sufficient oxygen-absorbing performance without containing a metal. In addition, the packaging material or the packaging container does not generate an unpleasant odor, and can maintain the content stored therein in a good state.

The invention claimed is:

1. A polyester amide compound, comprising:
a polycarboxylic acid unit in an amount of from 25 to 50 mol %, the polycarboxylic acid unit comprising an aromatic dicarboxylic acid unit of formula (I):

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 |
|---|---|---|---|---|---|---|---|---|---|---|---|---|---|---|
| Esterification step | Polycarboxylic acid (mol) | PTA | 50 | 50 | 50 | 50 | 50 | 50 | 50 | 50 | 50 | 50 | 50 | 50 |
| | Aliphatic diol (mol) | EG | 65 | 65 | 65 | 65 | 65 | 65 | 65 | 65 | 65 | 65 | 65 | 65 |
| | Tertiary-hydrogen-containing carboxylic acid (mol) | DL-ALA | 3 | 6 | 12 | 20 | 30 | 40 | — | — | 12 | 12 | — | — |
| | | DL-AABA | — | — | — | — | — | — | 12 | — | — | — | — | — |
| | | DL-Phe | — | — | — | — | — | — | — | 12 | — | — | — | — |
| | | AIB | — | — | — | — | — | — | — | — | — | — | — | 12 |
| Melt-polycondensation step | TBT catalyst (ppm, Ti concentration) | | 100 | 100 | 100 | 100 | 100 | 100 | 100 | 100 | 50 | 150 | 50 | 100 |
| | Maximum resin temperature (° C.) | | 260 | 255 | 250 | 250 | 250 | 250 | 250 | 250 | 250 | 265 | 275 | 255 |
| | Reaction time (hours) | | 3 | 3 | 4 | 4 | 4 | 4 | 4 | 4 | 2 | 5 | 3 | 4 |
| Polymer properties | Percent copolymerization of tertiary-hydrogen-containing carboxylic acid (mol %) | | 3.2 | 5.9 | 12 | 19.2 | 29 | 38.5 | 11.3 | 11.4 | 12 | 12 | 0 | 11.5 |
| | Intrinsic viscosity (dL/g) | | 0.6 | 0.57 | 0.52 | 0.49 | 0.42 | 0.39 | 0.51 | 0.49 | 0.17 | 1.1 | 0.62 | 0.5 |
| | Melting point (° C.) | | 248 | 239 | 225 | N.D. | N.D. | N.D. | 227 | 228 | 225 | 225 | 256 | 226 |
| | Amount of oxygen absorption (cc/g) | | 3 | 5 | 8 | 15 | 21 | 27 | 7 | 7 | 8 | 7 | 0 | 0 |

PTA: terephthalic acid
EG: ethylene glycol
DL-ALA: DL-alanine
DL-AABA: DL-2-aminobutyric acid
DL-Phe: DL-phenylalanine
AIB: 2-aminoisobutyric acid
TBT: tetra-n-butyl titanate
N.D.: Not Detected

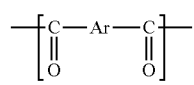

in an amount of 70 mol % or more;
a polyhydric alcohol unit in an amount of from 25 to 50 mol %, the polyhydric alcohol unit comprising an aliphatic diol unit of formula (II):

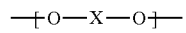

in an amount of 70 mol % or more; and
a structural unit of formula (III):

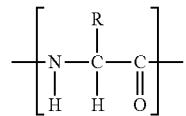

in an amount of from 0.1 to 50 mol %
wherein Ar is an arylene group;
X is a C2 to C20 alkylene group; and
R is a substituted or unsubstituted alkyl group or a substituted or unsubstituted aryl group.

2. The polyester amide compound according to claim 1, wherein the aromatic dicarboxylic acid unit comprises, in a total amount of 50 mol % or more, at least one species selected from the group consisting of an isophthalic acid unit, a terephthalic acid unit, and a 2,6-naphthalenedicarboxylic acid unit.

3. The polyester amide compound according to claim 1, wherein the aliphatic diol unit comprises, in a total amount of 50 mol % or more, at least one species selected from the group consisting of an ethylene glycol unit, a 1,3-propanediol unit, and a 1,4-butanediol unit.

4. The polyester amide compound according to claim 1, wherein R is a substituted or unsubstituted C1 to C6 alkyl group or a substituted or unsubstituted C6 to C10 aryl group.

5. The polyester amide compound according to claim 1, which has an intrinsic viscosity of from 0.4 dL/g to 1.5 dL/g.

6. The polyester amide compound according to claim 1, which has an intrinsic viscosity of 0.1 dL/g or more and less than 0.4 dL/g.

7. A polyester amide composition comprising the polyester amide compound of claim 1.

8. The composition of claim 7, wherein the composition is a packaging material or a packaging container.

9. The composition of claim 1, wherein the amount of the structural unit of formula (III) is 0.2 mol % or more.

10. The composition of claim 1, wherein the amount of the structural unit of formula (III) is 45 mol % or less.

11. The composition of claim 1, wherein the amount of the aromatic dicarboxylic acid unit in the polycarboxylic acid unit is 80 mol % or more.

12. The composition of claim 1, wherein Ar is a phenylene or naphthylene group.

13. The composition of claim 1, wherein the polycarboxylic acid unit further comprises a C2 to C20 aliphatic dicarboxylic acid, an alicyclic dicarboxylic acid, a tri- or more-valent polycarboxylic acid, an anhydride, a C1 to C3 alkyl ester thereof, or any combination thereof.

14. The composition of claim 1, wherein the amount of the aliphatic diol unit in the polyhydric alcohol unit is 80 mol % or more.

15. The composition of claim 1, wherein X is a C2 to C12 alkylene group.

16. The composition of claim 1, wherein R is an alkyl group having 1 to 15 carbon atoms or an aryl group having 6 to 16 carbon atoms.

17. The composition of claim 1, wherein R is methyl, ethyl, benzyl, or any combination thereof.

* * * * *